US012756719B2

(12) United States Patent
Gaffney et al.

(10) Patent No.: US 12,756,719 B2
(45) Date of Patent: Oct. 6, 2026

(54) SYSTEMS AND METHODS FOR FACILITATING TABLETOP EXERCISES USING COLLABORATION ROOMS WITH DYNAMIC TENANCY

(71) Applicant: Cygnvs Inc., San Mateo, CA (US)

(72) Inventors: Kevin Gaffney, Dublin (IE); Vikas Chittoor, Chengalpattu District (IN); Balaji Viswanathan, Chennai (IN); Aravindh Seshasayee Nageswara Raja, Chennai (IN); Karthick Kumar, Madurai (IN); Aneel Panyam, Hyderabad (IN); Ana Vallejo Ureña, Dublin (IE); Darragh Buffini, Dublin (IE); Sai Avala, San Francisco, CA (US)

(73) Assignee: Cvgnvs Inc., San Mateo, CA (US)

( * ) Notice: Subject to any disclaimer, the term of this patent is extended or adjusted under 35 U.S.C. 154(b) by 33 days.

(21) Appl. No.: 18/955,608

(22) Filed: Nov. 21, 2024

(65) Prior Publication Data

US 2025/0080543 A1 Mar. 6, 2025

Related U.S. Application Data

(63) Continuation-in-part of application No. 17/939,865, filed on Sep. 7, 2022, now Pat. No. 12,166,768, which (Continued)

(51) Int. Cl.

| | |
|---|---|
| ***H04L 9/40*** | (2022.01) |
| ***G06F 16/22*** | (2019.01) |
| ***G06Q 10/101*** | (2023.01) |

(52) U.S. Cl.

CPC ........ *H04L 63/105* (2013.01); *G06F 16/2246* (2019.01); *H04L 63/0853* (2013.01); *G06Q 10/101* (2013.01)

(58) Field of Classification Search

CPC ............... H04L 63/105; H04L 63/0853; G06F 16/2246; G06Q 10/101

(Continued)

(56) References Cited

U.S. PATENT DOCUMENTS 6,188,407 B1 2/2001 Smith
6,324,581 B1 11/2001 Xu et al.

(Continued)

OTHER PUBLICATIONS

Using LLMs for Tabletop Exercises within the Security Domain, Hays et al., Mar. 2024 (Year: 2024).*

(Continued)

*Primary Examiner* — Jahangir Kabir

(74) *Attorney, Agent, or Firm* — Carr & Ferrell LLP; Myrna M. Schelling

(57) ABSTRACT

Systems and methods for facilitating tabletop exercises are disclosed. An example method includes establishing, via an orchestration service, a digital collaboration room for an entity; receiving an incident response plan; generating a tabletop exercise having injects; storing the tabletop exercise in a database; granting access and control to a facilitator user; transmitting invitations to users invited to become a participant user of the tabletop exercise; activating an isolate mode for the collaboration room; granting tokens and permissions relating to the collaboration room to the participant user; unlocking the locked inject and retrieving data relating to the unlocked inject from the database for the digital collaboration room; receiving a response from the participant user regarding the data relating to the inject; generating feedback regarding the incident response plan and obtained from a machine learning model; and refining the incident response plan based on the participant user's response and the feedback.

22 Claims, 15 Drawing Sheets

Related U.S. Application Data is a continuation of application No. 17/476,367, filed on Sep. 15, 2021, now Pat. No. 11,477,208.

(58) Field of Classification Search
USPC ..................................................... 726/4
See application file for complete search history.

(56) References Cited

U.S. PATENT DOCUMENTS

| | | | |
|---|---|---|---|
| 7,587,499 | B1 | 9/2009 | Haghpassand |
| 8,151,323 | B2 | 4/2012 | Harris |
| 8,832,268 | B1 | 9/2014 | Chheda |
| 8,874,741 | B2 | 10/2014 | Hassan et al. |
| 9,240,996 | B1 | 1/2016 | Sinnema |
| 9,858,559 | B2 | 1/2018 | Raleigh et al. |
| 9,953,007 | B2 | 4/2018 | Oyarzabal et al. |
| 9,990,134 | B2 | 6/2018 | Keeler |
| 10,182,045 | B2 | 1/2019 | Banga et al. |
| 10,234,853 | B2 | 3/2019 | Mukkamala et al. |
| 10,467,029 | B1 | 11/2019 | Lin |
| 10,483,003 | B1 | 11/2019 | McNair |
| 10,698,926 | B2 | 6/2020 | Zhou et al. |
| 10,708,135 | B1 | 7/2020 | Elliott |
| 10,797,964 | B2 | 10/2020 | Chheda |
| 10,810,361 | B1 | 10/2020 | Venkatraman et al. |
| 10,990,488 | B1 | 4/2021 | Brown |
| 11,017,398 | B2 | 5/2021 | Potadar et al. |
| 11,188,857 | B1 | 11/2021 | Hill |
| 11,354,430 | B1 | 6/2022 | Tharakan et al. |
| 11,477,208 | B1 | 10/2022 | Urena |
| 11,483,293 | B1 * | 10/2022 | Spain .................... H04L 63/029 |
| 11,526,825 | B2 | 12/2022 | Avala et al. |
| 11,665,169 | B2 | 5/2023 | Viswanathan et al. |
| 12,015,617 | B2 | 6/2024 | Gaffney et al. |
| 12,041,062 | B2 | 7/2024 | Gaffney et al. |
| 12,166,768 | B2 | 12/2024 | Urena et al. |
| 12,299,557 | B1 * | 5/2025 | Ellis ..................... G06N 3/0475 |
| 2005/0251500 | A1 | 11/2005 | Vahalia et al. |
| 2008/0086363 | A1 | 4/2008 | Kass |
| 2009/0307166 | A1 | 12/2009 | Routray |
| 2010/0088636 | A1 | 4/2010 | Yerkes |
| 2010/0169860 | A1 | 7/2010 | Biazetti |
| 2011/0010349 | A1 | 1/2011 | Ellingson et al. |
| 2011/0173679 | A1 | 7/2011 | Perumal |
| 2012/0096521 | A1 | 4/2012 | Peddada |
| 2012/0110651 | A1 | 5/2012 | Van Biljon et al. |
| 2012/0158821 | A1 | 6/2012 | Barros |
| 2013/0191531 | A1 | 7/2013 | Kruglick |
| 2014/0089039 | A1 | 3/2014 | McClellan |
| 2014/0278755 | A1 | 9/2014 | Eberl et al. |
| 2015/0112700 | A1 | 4/2015 | Sublett et al. |
| 2015/0120359 | A1 | 4/2015 | Dongieux |
| 2015/0134733 | A1 | 5/2015 | Maturana et al. |
| 2015/0154643 | A1 | 6/2015 | Artman et al. |
| 2015/0163206 | A1 | 6/2015 | McCarthy et al. |
| 2015/0172321 | A1 | 6/2015 | Kirti et al. |
| 2015/0281453 | A1 | 10/2015 | Maturana et al. |
| 2015/0310188 | A1 | 10/2015 | Ford et al. |
| 2015/0324400 | A1 | 11/2015 | Sheck et al. |
| 2016/0294854 | A1 | 10/2016 | Parthasarathi et al. |
| 2016/0335260 | A1 | 11/2016 | Convertino et al. |
| 2016/0378450 | A1 | 12/2016 | Fu et al. |
| 2016/0378728 | A1 | 12/2016 | Pryhuber |
| 2017/0006135 | A1 | 1/2017 | Siebel et al. |
| 2017/0041296 | A1 | 2/2017 | Ford et al. |
| 2017/0099181 | A1 | 4/2017 | Hawking et al. |
| 2017/0124502 | A1 | 5/2017 | Brew et al. |
| 2017/0132721 | A1 | 5/2017 | Riley |
| 2017/0149630 | A1 | 5/2017 | Feller et al. |
| 2017/0169699 | A1 | 6/2017 | Will |
| 2017/0195265 | A1 | 7/2017 | Billi |
| 2017/0255455 | A1 | 9/2017 | Collier |
| 2017/0262142 | A1 | 9/2017 | Riley |
| 2017/0282014 | A1 | 10/2017 | Quinn |
| 2018/0027006 | A1 | 1/2018 | Zimmermann et al. |
| 2018/0144314 | A1 | 5/2018 | Miller |
| 2018/0152358 | A1 | 5/2018 | Chheda |
| 2018/0165386 | A1 | 6/2018 | Soundiramourthy et al. |
| 2018/0181716 | A1 | 6/2018 | Mander et al. |
| 2018/0321820 | A1 | 11/2018 | Burman |
| 2018/0365278 | A1 | 12/2018 | Klöhn |
| 2019/0034047 | A1 | 1/2019 | Kwiecien |
| 2019/0065177 | A1 | 2/2019 | Khoongumjorn et al. |
| 2019/0095241 | A1 | 3/2019 | Ago et al. |
| 2019/0102440 | A1 | 4/2019 | Tabak et al. |
| 2019/0163814 | A1 | 5/2019 | Codella |
| 2019/0325373 | A1 | 10/2019 | Dillon et al. |
| 2019/0339821 | A1 | 11/2019 | Vajjala |
| 2020/0007554 | A1 | 1/2020 | Vincent et al. |
| 2020/0034764 | A1 | 1/2020 | Panuganty |
| 2020/0067789 | A1 | 2/2020 | Khuti et al. |
| 2020/0097920 | A1 | 3/2020 | Doctor |
| 2020/0104401 | A1 | 4/2020 | Burnett et al. |
| 2020/0104402 | A1 | 4/2020 | Burnett et al. |
| 2020/0151836 | A1 | 5/2020 | Lingras et al. |
| 2020/0160458 | A1 | 5/2020 | Bodin |
| 2020/0162917 | A1 | 5/2020 | Anantha et al. |
| 2020/0202271 | A1 | 6/2020 | Brannon et al. |
| 2020/0210647 | A1 | 7/2020 | Panuganty et al. |
| 2020/0218432 | A1 | 7/2020 | Malhotra |
| 2020/0233685 | A1 | 7/2020 | Petkov et al. |
| 2020/0234218 | A1 | 7/2020 | Salloum et al. |
| 2020/0342520 | A1 | 10/2020 | Pandey |
| 2020/0344185 | A1 | 10/2020 | Singaraju et al. |
| 2020/0349173 | A1 | 11/2020 | Chawla et al. |
| 2021/0120043 | A1 | 4/2021 | Karpovsky |
| 2021/0160018 | A1 | 5/2021 | Han |
| 2021/0216381 | A1 | 7/2021 | Huang |
| 2021/0275899 | A1 | 9/2021 | Hyodo |
| 2021/0409218 | A1 | 12/2021 | Elmenshawy |
| 2022/0027828 | A1 | 1/2022 | Avala et al. |
| 2023/0078169 | A1 | 3/2023 | Urena et al. |
| 2023/0208869 | A1 * | 6/2023 | Bisht ........................ G06N 7/01 726/23 |
| 2023/0291744 | A1 | 9/2023 | Gaffney et al. |
| 2023/0421567 | A1 | 12/2023 | Gaffney et al. |
| 2026/0019425 | A1 | 1/2026 | Gaffney et al. |

OTHER PUBLICATIONS

From Paper to Platform: Evolution of a Novel Learning Environment for Tabletop Exercises, Svabensky et al, Jul. 2024 (Year: 2024).*

Sun et al., "Designing a Unified Cloud Log Analytics Platform," 2016 International Conference on Collaboration Technologies and Systems (CTS) , Orlando, FL, 2016, pp. 257-266, doi: 10.1109/CTS.2016.0057.

Kilgore et al., "A Precision Information Environment (PIE) for emergency responders: Providing collaborative manipulation, role-tailored visualization, and integrated access to heterogeneous data," 2013 IEEE International Conference on Technologies for Homeland Security, 2013, 6 pages.

Yu et al., "Distributed Big Data Analytics in Service Computing," 2017 IEEE 13th International Symposium on Autonomous Decentralized System (ISADS), Bangkok, 2017, pp. 55-60, doi: 10.1109/ISADS.2017.17.

Czajkowski et al., "ERMrest: An Entity-relationship Data Storage Service for Web-based, Data-oriented Collaboration," Oct. 19, 2016, 12 pages.

Amrutiya et al., "Trustless Two-Factor Authentication using Smart Contracts in Blockchains," 2019 International Conference on Information Networking (ICOIN), Kuala Lumpur, Malaysia, doi: 10.1109/ICOIN.2019.8718198, 2019, pp. 66-71.

Suzic et al., "Towards Secure Collaboration in Federated Cloud Environments," 2016 11th International Conference on Availability, Reliability and Security (ARES), Aug. 2016, 10 pages.

Madani et al., "Access Control in a Collaborative Session in Multi Tenant Environment,", Dec. 2015, 6 pages.

* cited by examiner

SYSTEMS AND METHODS FOR FACILITATING TABLETOP EXERCISES USING COLLABORATION ROOMS WITH DYNAMIC TENANCY

CROSS-REFERENCE TO RELATED APPLICATIONS

This application is a continuation-in-part of U.S. application Ser. No. 17/939,865, filed on Sep. 7, 2022, now U.S. Pat. No. 12,166,768 issued on Dec. 10, 2024, titled "Systems and Methods of Entity Control of Collaboration Rooms", which is a continuation of U.S. application Ser. No. 17/476,367, filed on Sep. 15, 2021, now U.S. Pat. No. 11,477,208, issued on Oct. 18, 2022, titled "Systems and Methods for Providing Collaboration Rooms with Dynamic Tenancy and Role-based Security", all of which are hereby incorporated by reference herein in their entireties, including all references and appendices cited therein, for all purposes, as if fully set forth herein.

This application is also related to U.S. application Ser. No. 16/940,272, filed on Jul. 27, 2020, now U.S. Pat. No. 11,526,825, issued on Dec. 13, 2022, titled "Cloud-Based Multi-Tenancy Computing Systems and Methods for Providing Response Control and Analytics", U.S. application Ser. No. 17/477,384, filed on Sep. 16, 2021, now U.S. Pat. No. 11,354,430, issued on Jun. 7, 2022, titled "Systems and Methods for Dynamically Establishing and Managing Tenancy Using Templates", and U.S. application Ser. No. 18/196,967, filed on May 12, 2023, now U.S. Pat. No. 12,015,617, issued on Jun. 18, 2024, titled "Systems and Methods for Providing Secure Access to Collaboration Rooms with Dynamic Tenancy in Response to an Event", all of which are hereby incorporated by reference herein in their entireties, including all references and appendices cited therein, for all purposes, as if fully set forth herein.

FIELD OF THE PRESENT TECHNOLOGY

The present disclosure pertains to systems and methods for facilitating tabletop exercises (TTX) using collaboration rooms with dynamic tenancy.

SUMMARY

Some embodiments of the present disclosure are directed to a method for facilitating tabletop exercises, comprising: establishing, via an orchestration service, a digital collaboration room for an entity, the entity having control to grant permissions to the users regarding the digital collaboration room and to dynamically modify permissions of the users in real time, the orchestration service being a cloud resource where the digital collaboration room, owned by the entity, is hosted and made accessible to the users; receiving, from the entity, an incident response plan; based on the incident response plan, generating a tabletop exercise having one or more injects, each inject comprising a simulation of a runtime scenario, each inject being locked or unlocked; storing the tabletop exercise in a database; granting access and control of the tabletop exercise and the injects to a facilitator user, the facilitator user further configured to moderate participant users during an execution of the tabletop exercise; transmitting invitations to one or more users who are invited to become a participant user of the tabletop exercise; upon receiving acceptance of the invitations by the one or more users to become a participant user, activating an isolate mode for the collaboration room, in which the participant user is notified or re-routed to access the collaboration room by way of the participant user's backup email account; granting participant tokens and corresponding permissions relating to the collaboration room to the participant user; receiving a request from the facilitator user to unlock a locked inject of the tabletop exercise; unlocking the locked inject and retrieving data relating to the unlocked inject from the database for the digital collaboration room, thereby granting access to the data relating to the unlocked inject to the participant user; receiving a response from the participant user regarding the data relating to the inject; based on the response from the participant user, generating feedback regarding the incident response plan, the feedback obtained from a recommendation machine learning model trained to identify gaps in the incident response plan and provide recommendations to improve the incident response plan; and refining the incident response plan based on the response from the participant user and the generated feedback.

Some embodiments of the present disclosure are directed to a system for facilitating tabletop exercises, the system comprising a processor and memory for storing executable instructions, the processor executing the instructions to: establish, via an orchestration service, a digital collaboration room for an entity, the entity having control to grant permissions to the users regarding the digital collaboration room and to dynamically modify permissions of the users in real time, the orchestration service being a cloud resource where the digital collaboration room, owned by the entity, is hosted and made accessible to the users; receive, from the entity, an incident response plan; based on the incident response plan, generate a tabletop exercise having one or more injects, each inject comprising a simulation of a runtime scenario, each inject being locked or unlocked; store the tabletop exercise in a database; grant access and control of the tabletop exercise and the injects to a facilitator user, the facilitator user further configured to moderate participant users during an execution of the tabletop exercise; transmit invitations to one or more users who are invited to become a participant user of the tabletop exercise; upon receiving acceptance of the invitations by the one or more users to become a participant user, activate an isolate mode for the collaboration room, in which the participant user is notified or re-routed to access the collaboration room by way of the participant user's backup email account; grant participant tokens and corresponding permissions relating to the collaboration room to the participant user; receive a request from the facilitator user to unlock a locked inject of the tabletop exercise; unlock the locked inject and retrieving data relating to the unlocked inject from the database for the digital collaboration room, thereby granting access to the data relating to the unlocked inject to the participant user; receive a response from the participant user regarding the data relating to the inject; based on the response from the participant user, generating feedback regarding the incident response plan, the feedback obtained from a recommendation machine learning model trained to identify gaps in the incident response plan and provide recommendations to improve the incident response plan; and refine the incident response plan based on the response from the participant user and the generated feedback.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Overview

Figure 1:
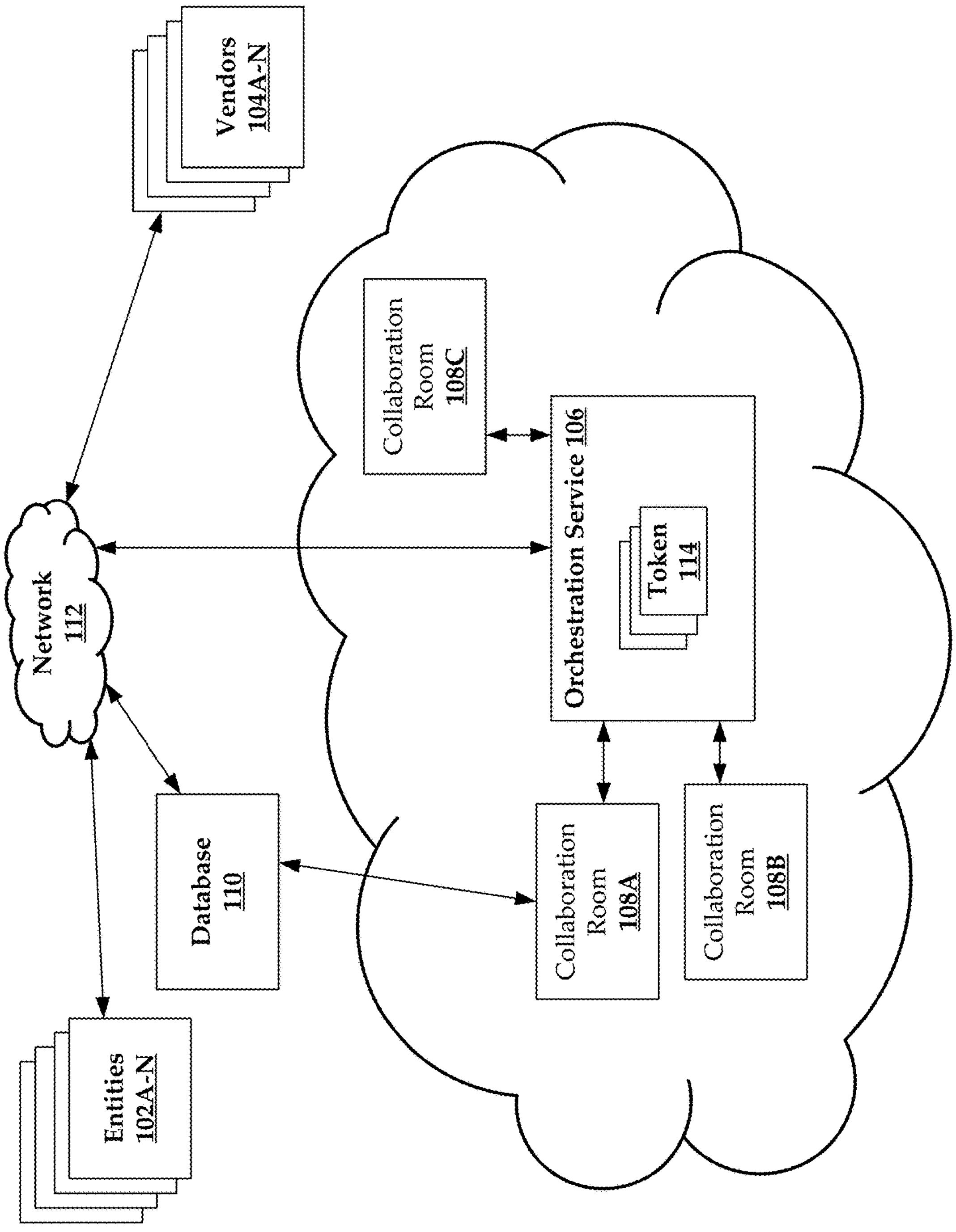
FIG. 1 depicts an example architecture where the systems and methods of the present disclosure can be implemented.

Broadly, the present disclosure is directed to systems and methods for facilitating tabletop exercises (also referred to as "TTX") using collaboration rooms with dynamic tenancy. Entities use tabletop exercises as a role-playing activity or a simulation, in order to measure the effectiveness of their incident response (IR) plan. Tabletop exercises are usually discussion-based sessions where teams meet in a classroom setting to discuss their roles and responses or plan of action during an incident or a crisis. A facilitator of the tabletop exercise can help guide participants through one or more incident or crisis scenarios. A facilitator can also moderate discussions about how to address such scenarios.

Current tabletop exercises fail to simulate actual incidents, and oftentimes current tabletop exercises make use of the entity's tools (or organizational tools) which may not be available to participants of the tabletop exercises during a crisis. Indeed, most entities oftentimes provide disparate resources to participants (or users) for the facilitation of tabletop exercises. Those disparate resources may or may not be available to those participants during a crisis, such as a cyber crisis. For example, most entities have only an organization account or a business account, which a participant may not be able to access. This poses many access problems and obstacles to participants who desire to participate in tabletop exercises. Furthermore, traditional incident response plans and tabletop exercises often do not co-exist within a single platform. Thus, entities can find it challenging to incorporate feedback from a given tabletop exercise into a specific incident response plan and amend that incident response plan for future use.

The present disclosure addresses these problems and more, by providing organizations with a single out-of-band (OOB) platform as a means for hosting and collaborating on incident response plans. Specifically, the present disclosure allows for a tabletop exercise to be conducted using the exemplary platform, where users (including facilitators) can provide their incident response plans and collaborate with all the stakeholders that are required for an incident response. Users can utilize the conferencing facility present within the application to run the incident simulation in real time. By allowing the tabletop exercise to run within the platform, users can experience firsthand the issues that arise from a given incident (such as a cyber crisis) and can role-play or otherwise reenact the exact steps that should be taken while responding to the incident. Over time, the incident response plan upon which the users run tabletop exercises will be refined, based on the inputs that the system captures as part of the tabletop exercises and the outcomes of the tabletop exercises. Furthermore, a tabletop exercise can be accompanied by an after-action report which can then be used to refine the incident response plan.

In summary, the present disclosure describes the exemplary systems and methods for conducting or facilitating tabletop exercises that mimic real-life incidents, such as cyber crises, by using a single out-of-band platform. By facilitating tabletop exercises, the exemplary systems and methods described herein allow users to practice, amend and refine an incident response plan with the assistance of the platform, while training participants or users on how to respond to a specific incident in accordance with the incident response plan. In other words, the systems and methods described herein measure effectiveness of incident response plans and participants' preparedness for crisis scenarios.

Example Embodiments

Collaboration Rooms with Dynamic Tenancy

Broadly, the present disclosure is directed to systems and methods for establishing and managing digital collaboration rooms. A plurality of digital collaboration rooms can be established for a plurality of entities, such as companies. A collaboration room can be established to allow users to access data pertaining to an event, such as a lawsuit or a data breach. Users may be associated with the entity or a vendor who may assist the entity with respect to the event. For example, a vendor can include a law firm, a lawyer, privacy counsel, technology consulting, credit monitoring, brokers, public relations, insurance, and notification services-just to name a few. While some embodiments involve creating a collaboration room or other similar virtual collaboration environment based on an event, such spaces can be created for purposes of group collaboration without being connected to or initiated by an event.

The systems and methods provide an orchestration service where entities can maintain collaboration rooms. The orchestration service can also include vendor accounts or profiles. Entities can select vendors to invite to their collaboration room(s). Vendors can access the collaboration room(s) of one or more entities through the orchestration service, and access data depending on their particular permissions or rights granted to them by the entity.

In some instances, many users may need to access data inside the collaboration room, and each of these users may have different permissions with respect to the data. The systems and methods can maintain roles that specify the permissions for each user. In one embodiment, the permissions can be modified, resulting in real-time or near-real-time changes to the role of the user. Indeed, the entity is provided with complete control of users who are allowed to enter the collaboration room, as well as what actions the users are allowed to perform on the data inside the collaboration room. In some instances, the permissions for the user, as well as what collaboration rooms they can enter, can be encoded into a token.

The systems and methods can perform a hierarchical permissions analysis as users request actions within a collaboration room. In some instances, each time a user performs an action inside the collaboration room, such as refreshing, viewing, editing, deleting, or other similar actions, a hierarchical permissions analysis is executed to determine if the user has permission to perform the requested action, as well as if the user has access rights to be in the collaboration room. This hierarchical permissions analysis can be used to effectuate the dynamic tenancy aspects disclosed herein, as will be discussed in greater detail herein.

Also, in some configurations, the systems and methods may obtain data from a database and allow actions to be performed on the data inside the collaboration room. These data are not maintained in a cache or preserved locally. Thus, access to the data is controlled and actions can only be performed on the data in the collaboration room by an authorized user.

FIG. 1 illustrates an example architecture where aspects of the present disclosure can be performed. The architecture may include a plurality of entities, such as entities 102A-N, a plurality of vendors, such as vendors 104A-N, and an orchestration service 106. These components can communicate with one another over a network 112. In general, the architecture creates a global network of users, both entity-related and vendor-related, who can access digital collaboration rooms. Vendors or service providers can publish service-related information. The orchestration service can allow the vendors to be selectable by the plurality of entities.

The entities can also request the creation of collaboration rooms. For example, entity 102A can establish collaboration rooms 108A and 108B, while another entity can establish collaboration room 108C. Entities can control when and how vendors access these collaboration rooms, as well as what kinds of actions the users can perform against data obtained from a database 110. As will be discussed herein, data can be pulled from the database 110 on an as-needed basis. In some embodiments, data does not persist in a collaboration room beyond a session with one or more vendors.

The network 112 can include combinations of networks that enable the components in the architecture to communicate with one another. The network 112 may include any one or a combination of multiple different types of networks, such as cellular, cable, the Internet, wireless networks, and other private and/or public networks. In some instances, the network 112 may include Wi-Fi or Wi-Fi direct. The network 112 can include short-range or radiofrequency links such as BLUETOOTH or ultra-wideband (UWB).

The orchestration service 106 can allow an entity to establish a collaboration room. The digital collaboration room can be configured to allow users to perform actions on data obtained from a database and placed into the digital collaboration room. For example, entity 102A can establish collaboration rooms 108A and 108B, where collaboration room 108A pertains to a first event, such as a cybersecurity breach, and collaboration room 108B, which pertains to a ransomware event. In general, collaboration rooms can be created in response to an incident or event (although in some instances rooms are not created in response to an event, but simply to allow users to collaborate). The orchestration service 106 can assign each entity a tenant identifier. The orchestration service 106 can assign each collaboration room a digital collaboration room identifier.

There are two types of users on the entity side (additional roles can also be specified). For example, entity users can have an administrator role or a participant role. These users are typically employees who help the entity navigate an event. The entity can invite any of the vendors to access a particular collaboration room.

When an entity chooses a vendor from the global network of users, the orchestration service 106 can generate a token 114 for the vendor user. The token 114 can embed a set of long-lived credentials that allow a user to perform an action on data with respect to a tenant (specified by a tenant ID), for a particular collaboration room (specified by a digital collaboration room ID). By long-lived, this means that privileges/permissions can persist until revoked by a user who has the right to revoke permissions. It will be understood that some privileges or credentials can be short-lived as well. For example, some privileges or credentials can be set to expire after a period of time or after a certain number of uses. A user could be allowed to view a document a set number of times, or until the expiration of a date in the future.

Also, when vendor users have been granted access to collaboration rooms of various entities, the orchestration service 106 can allow vendors to enter and exit collaboration rooms as needed. The orchestration service 106 effectively functions as a cloud resource where collaboration rooms, owned by entities, can be hosted and made accessible to vendors.

The token 114 can include any one or more of a tenant identifier, a digital collaboration room identifier, an access right for the user to enter the digital collaboration room, and a role for the user. Generally speaking, the role specifies a set of permissions that indicate actions that can be performed by the user within the collaboration room. For example, a user who is a lawyer may be given a first set of permissions, whereas an insurance broker may be given a second set of permissions. The lawyer may be allowed to access and view any type of document, while the insurance broker may be allowed to access and view only data related to an insurance claim.

While some examples include roles that can be assigned on an individual user level, the orchestration service 106 also allows for the creation of higher-level user roles. For example, a general law firm role can be established which allows any user in the law firm to perform certain actions in the collaboration room.

The orchestration service 106 allows entities to specify what permissions are created for given roles. For example, a lawyer role can include a role with a set of permissions that allows the user to view all data, as well as other actions such as edit, delete, move, and so forth. Again, the orchestration service 106 allows actions to be performed on data placed in a collaboration room. The actions can include, but are not limited to, read, view, write, filter, edit, and so forth. For each action, there is a specific and defined permission that can be granted and encoded into a token for the user. In some instances, the permissions are selected by an administrative user of the entity that owns the digital collaboration room.

Additionally, the orchestration service 106 can allow entity administrator users the ability to set visibility of actions within the collaboration room. For example, the administrator may allow all users to see all actions that can be conducted in the collaboration room. In another embodiment, only users internal to an entity can view the actions that are available in the collaboration room. In yet another example, only people listed in a lead of the user section may be allowed to view actions in the collaboration room. For example, a head lawyer or technical specialist may be allowed to view actions, while others on their team may not. In sum, a user may have all or limited view into actions available in the collaboration room.

In some instances, the orchestration service 106 can email a requested vendor a link. The user can click the link to enter the digital collaboration room. For example, the vendor 104A can enter the collaboration room 108A of entity 102A. The orchestration service 106 can evaluate the token of the user to determine if they have permission to enter the collaboration room 108A. In some instances, the token can be linked to a session policy for the user. That is, the actions of the user can be managed on a session-by-session basis.

Once the user enters collaboration room 108A, the user can perform an action on data obtained from the database 110. For example, the vendor may request to view emails regarding a particular topic. In some instances, the orchestration service 106 can provide a query interface where the vendor can query for documents or other data using drop-down boxes, fields, or other input mechanisms.

If there are data responsive to the query, these data can be obtained from the database 110 and made available in the collaboration room 108A. The user can then be allowed to perform one or more actions against the data, assuming the user has permissions for such actions. Thus, the orchestration service 106 can be configured to receive a request to perform an action on a portion of the data. That is, in some instances, the user can perform an action on all or a portion of the data included in the database 110.

The orchestration service 106 can maintain dynamic tenancy within the architecture. Dynamic tenancy allows for the permissions/role of a user to be updated at any time and to have these modifications to the permissions/role become effective in real-time or near-real-time. These changes in permissions/role for a user can occur even in instances where the user is active in the collaboration room. An administrator user for an entity can change the permissions for a vendor user at any time. For example, the permissions/role for a lawyer can be changed. The permissions may initially allow the lawyer to access all data/documents for the entity related to the incident or event associated with the collaboration room. Changes in these permissions may result in the lawyer being allowed to access only a portion of the data due to an identified conflict. In another example, a lawyer can be completely excluded as well, based on an identified conflict. While examples herein contemplate the entity having administrators that can change permissions, some vendor roles may also be allowed to edit permissions for subordinate vendor users. For example, a managing partner of a law firm can manage permissions assigned to individual lawyers in their firm.

As noted above, these permissions can be changed and effectuated in real-time. By way of example, when a user is in the collaboration room viewing documents, the user's permissions to view certain documents may be revoked. When the user attempts to refresh their view or open a document, the user will be blocked when the requested documents are in the portion of the data for which the permissions of the user have been revoked. The user can continue to operate in the collaboration room and perform other actions for which they have permission.

In some instances, the orchestration service 106 enables aspects of dynamic tenancy by performing continual permissions checks or analyses on users in the collaboration room. The orchestration service 106 can perform permissions checks any time a user performs or requests the performance of an action in the collaboration room. This can include actions such as refreshing a view of the collaboration room. In general, any behavior of a user in a collaboration room can be considered an action. Thus, an action is requested each time the user performs a refresh of the data in the digital collaboration room, or other similar actions.

For example, a user currently viewing a document may have their permission to view that document revoked. If the user refreshes their view or requests an action related to the document, access to that document can be revoked such that the user can no longer view or perform actions against that document. Again, as noted above, this can occur on a session-by-session basis, where permissions can be authorized for a session, and the permissions are rechecked in a subsequent session. Changes between sessions to the permissions can result in an alteration of user rights. In sum, an entity user or other authorized user can change the set of permissions which dynamically changes the role of the user, at any time.

To enable this dynamic tenancy and dynamic provision of permissions, the orchestration service 106 can be configured to perform a hierarchical permissions analysis. The hierarchical permissions analysis is a bottom-to-top permissions analysis that determines user who has requested an action has the requisite permission or right to perform the requested action. In some instances, the user can submit a request that requires more than one action. For example, a request to edit a document may include initially a request to obtain the document from the database, along with another request to allow the user to view the document, and finally a request to edit the document. Each of these requests may have a first permission associated therewith. The request to obtain could have a first permission, the request to view have a second permission, and the request to edit may have a third permission. In general, the third permission can depend on the user having the second permission, and the second permission can depend on the user having the first permission. This creates what is referred to as a dependency ordering of one or more actions.

Figure 2:
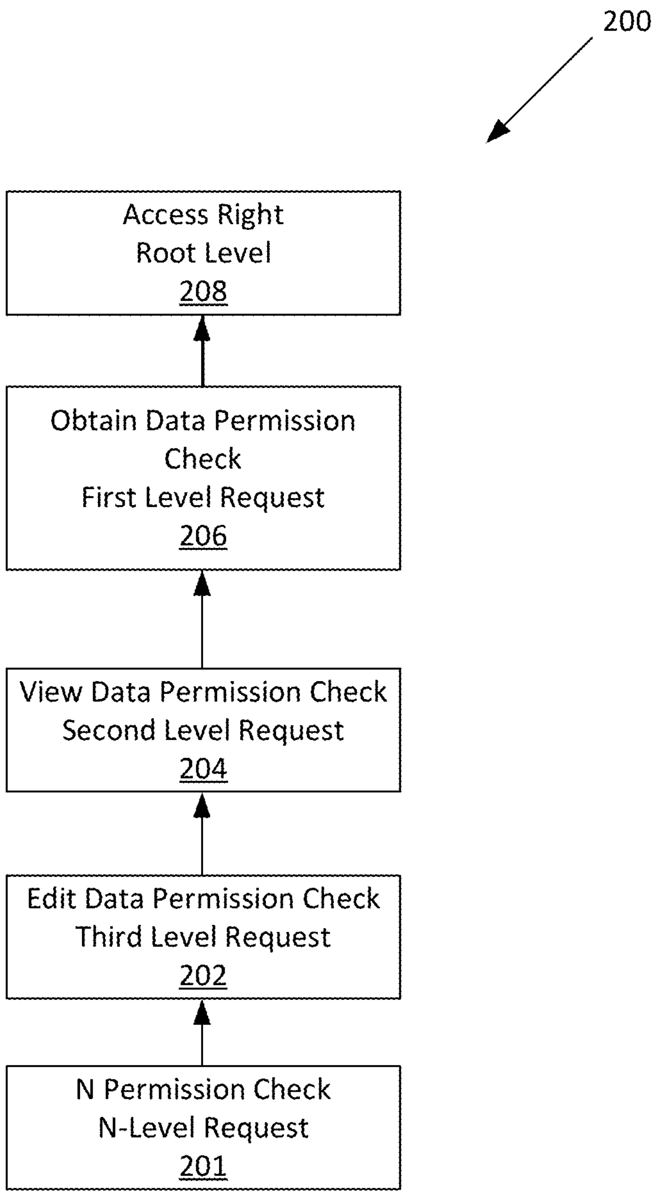
FIG. 2 illustrates an example tree structure for use in a hierarchical permissions analysis.

Referring now to FIGS. 1 and 2 collectively, generally, when more than one action is requested in a session, the actions can be considered as a tree structure 200. In one example, each of the one or more actions can be arranged into branches of a tree structure based on the dependency ordering. A third action would be on bottom level 202 of the tree structure, with the second action on a second level 204 above the third level, and the first action on a first level 206 above the second. A root level 208 of the tree structure can be the access right to the digital collaboration room. In general, each of the one or more actions are arranged into branches of a tree structure based on the dependency ordering, with the access right to the digital collaboration room being a root of the tree structure. While three levels have been shown, any N-number of levels of requests and permissions checks can be present (see 201 of FIG. 2).

In one example, an action or transaction can include either a read or write operation. To write, a user should possess permission to read and/or write from the bottom to the top of a tree structure. To read, a user should possess permission to read from the bottom to the top of a tree structure.

The orchestration service 106 can be configured to determine a dependency ordering of one or more actions related to the data. The hierarchical permissions analysis can include determining if the user has permission to perform each of the one or more actions, in a bottom-to-top manner based on the dependency ordering. Thus, when the user requests the third action of editing the document, the orchestration service 106 can determine if the user has permission to edit the document. Also, the orchestration service 106 also determines if the user has permission to view the document (second action), as well as permission to obtain the document (first permission). Finally, the orchestration service 106 also determines if the user currently has permission to enter the digital collaboration room.

These permissions checks occur in a layered fashion as well. For example, the user may first request only to obtain the document. A permissions check is then performed to ensure the user has the right to obtain the document. When the user then requests to open/view the document, the orchestration service 106 not only determines if they have permission to open/view the document, but the orchestration service 106 can again verify that the user has permission to obtain the document. The orchestration service 106 can also verify that the user currently has rights to be in the collaboration room at each separate permissions check. Thus, the orchestration service 106 can iteratively and/or recursively check for permissions at each level of the dependency ordering.

Again, these permissions checks are performed by the orchestration service 106 to ensure that none of the permissions have changed or been modified. For example, if the right of the user has been revoked to view the document, the user also cannot be allowed to edit the document. If the right of the user has been revoked to obtain the document, the user also cannot be allowed to view or edit the document. It will be understood that the user may still have rights to enter the digital collaboration room and conduct other actions. However, if the access rights of the user to enter the collaboration room have been revoked, the user can perform no actions.

The orchestration service 106 can deny access to all or a portion of the data when the role has been altered and the first user no longer has rights to perform the action. The orchestration service 106 can deny access to perform the action on the data when a permission of a set of permissions has been revoked but the user currently has permission to be in the digital collaboration room. In this example, the user can still be in the collaboration room and potentially be assigned other permissions. As noted above, this hierarchical permissions analysis can be executed each time a user performs any action inside the collaboration room. Also, the hierarchical permissions analysis is performed against the permissions in the token for the user. That is, the orchestration service 106 can convert the permissions into a set of rules that are run over data pulled from the database 110.

Assuming the user request passes the hierarchical permissions analysis, the orchestration service 106 can obtain data from a database and allow the one or more requested actions to be performed on the data.

In some embodiments, a tenant can be associated with one or more vaults (e.g., databases) that store data that can be used in a collaboration. A user can be associated with the tenant. The user can have a specified role, such as a provider/vendor role, a provider/administrator role, and/or a client role. These roles pertain to a collaboration room. A user can have vault roles as well, such as administrator role, a user role, and/or a vendor role. Thus, multiple users can have access to data in the vault. Each user can be allowed to perform one or more actions in a collaboration room related to data obtained from the vault inside the collaboration room.

A task can have n-number of associated tasks, messages, and/or facts. The user and data can have one or more visibility rules applied thereto. Example visibility rules can include, but are not limited to, allowing all users in the collaboration room to view data obtained from the vault, only allowing users internal to the entity to view data, and/or custom confidential users or organizations that can be explicitly added to view data.

Figure 3:
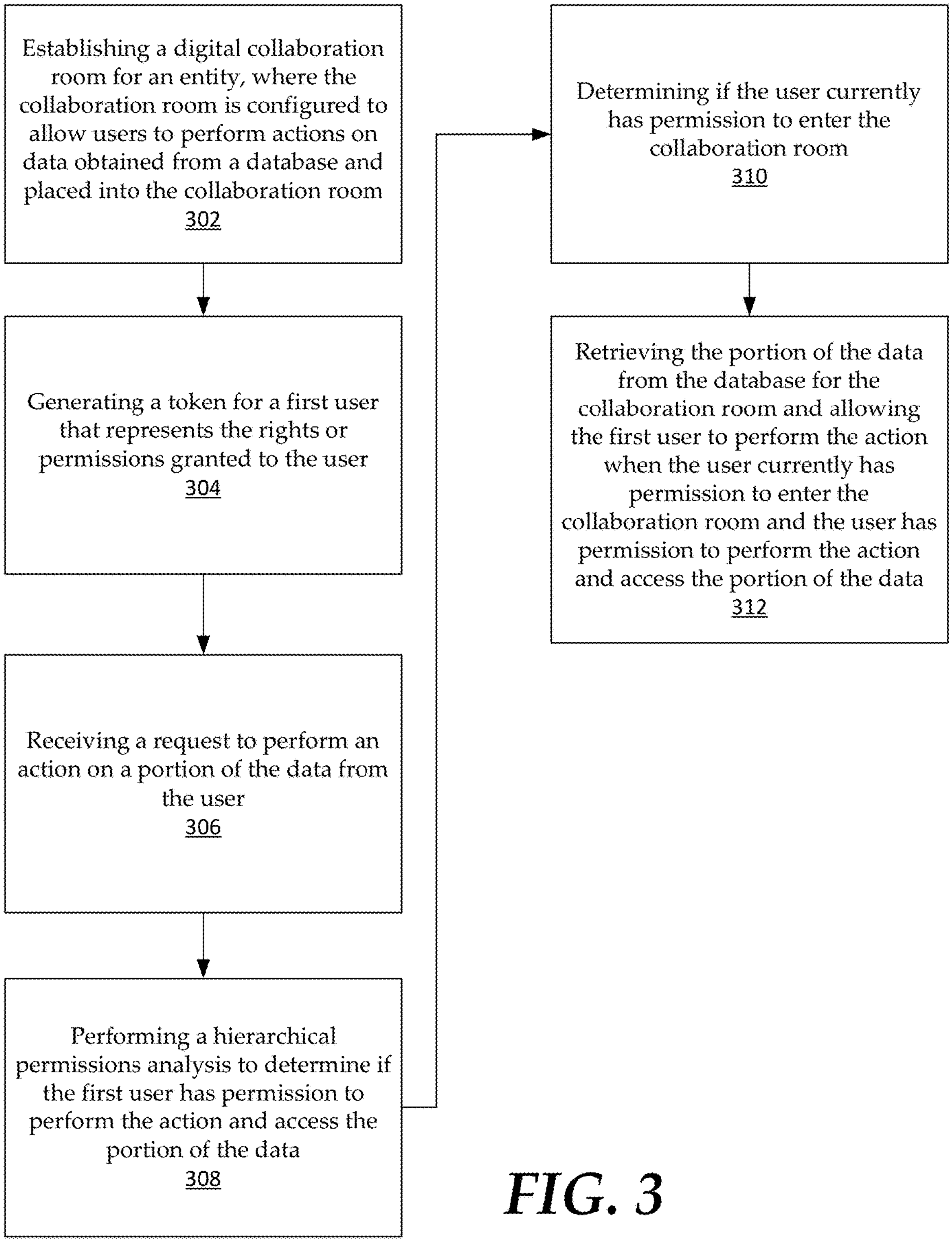
FIG. 3 is a flowchart of an example method of the present disclosure.

FIG. 3 is a flowchart of an example method of the present disclosure. The method can include a step 302 of establishing a digital collaboration room for an entity, where the digital collaboration room is configured to allow users to perform actions on data obtained from a database and placed into the digital collaboration room. In some instances, the entity and collaboration room are each given a unique ID.

Next, the method includes a step 304 of generating a token for a first user that represents the rights or permissions granted to the user. Generating the token may include encoding a tenant identifier, a digital collaboration room identifier, an access right for the first user to enter the digital collaboration room, and a role for the first user. To be sure, the role specifies a first set of permissions that indicate actions that can be performed by the first user.

Steps 302 and 304 can be performed for additional users. That is, a plurality of users can be granted tokens and corresponding permissions related to the collaboration room.

The method can include a step 306 of receiving a request to perform an action on a portion of the data from the user. For example, the user can submit a query to identify documents that are relevant to one or more keywords.

The method also includes a step 308 of performing a hierarchical permissions analysis to determine if the first user has permission to perform the action and access the portion of the data. The hierarchical permissions analysis can also include a step 310 of determining if the user currently has permission to enter the digital collaboration room. As noted above, this can include evaluating an access right included in the token for the user.

Assuming that the permissions analysis is successful, the method can include a step 312 of retrieving the portion of the data from the database for the digital collaboration room and allowing the first user to perform the action when the user currently has permission to enter the digital collaboration room and the user has permission to perform the action and access the portion of the data. If the permissions analysis is unsuccessful, the user can be presented with a message informing them that they lack permission to perform the requested action.

In some instances, the method can include specifying a role for the first user that includes a first set of permissions. The method can also include altering the first set of permissions and denying access to the portion of the data when the role has been altered and the first user no longer has rights to perform the action. Access to perform the action on the portion of the data can also be denied when a permission of the first set of permissions to perform the action has been revoked but the user currently has permission to be in the digital collaboration room. Thus, the access right may be intact and granted while permissions for dependent actions may be active or revoked.

Figure 4:
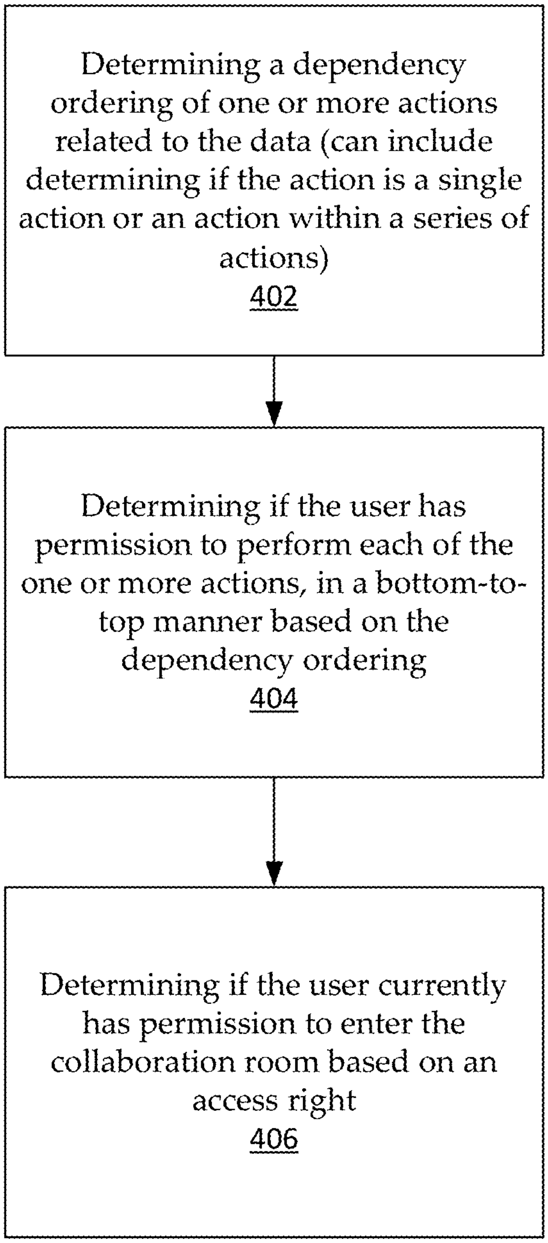
FIG. 4 is a flowchart of an example method of the present disclosure related to an example hierarchical permissions analysis.

FIG. 4 is a flowchart of another example method for performing a hierarchical permissions analysis that includes a step 402 of determining a dependency ordering of one or more actions related to the data. This can include determining if the action is a single action or an action within a series of actions. When more than one action is occurring or has been requested, the method can include a step 404 of determining if the user has permission to perform each of the one or more actions, in a bottom-to-top manner (e.g., iteratively or recursively) based on the dependency ordering. Next, the method includes a step 406 of determining if the user currently has permission to enter the digital collaboration room based on an access right.

Figure 5:
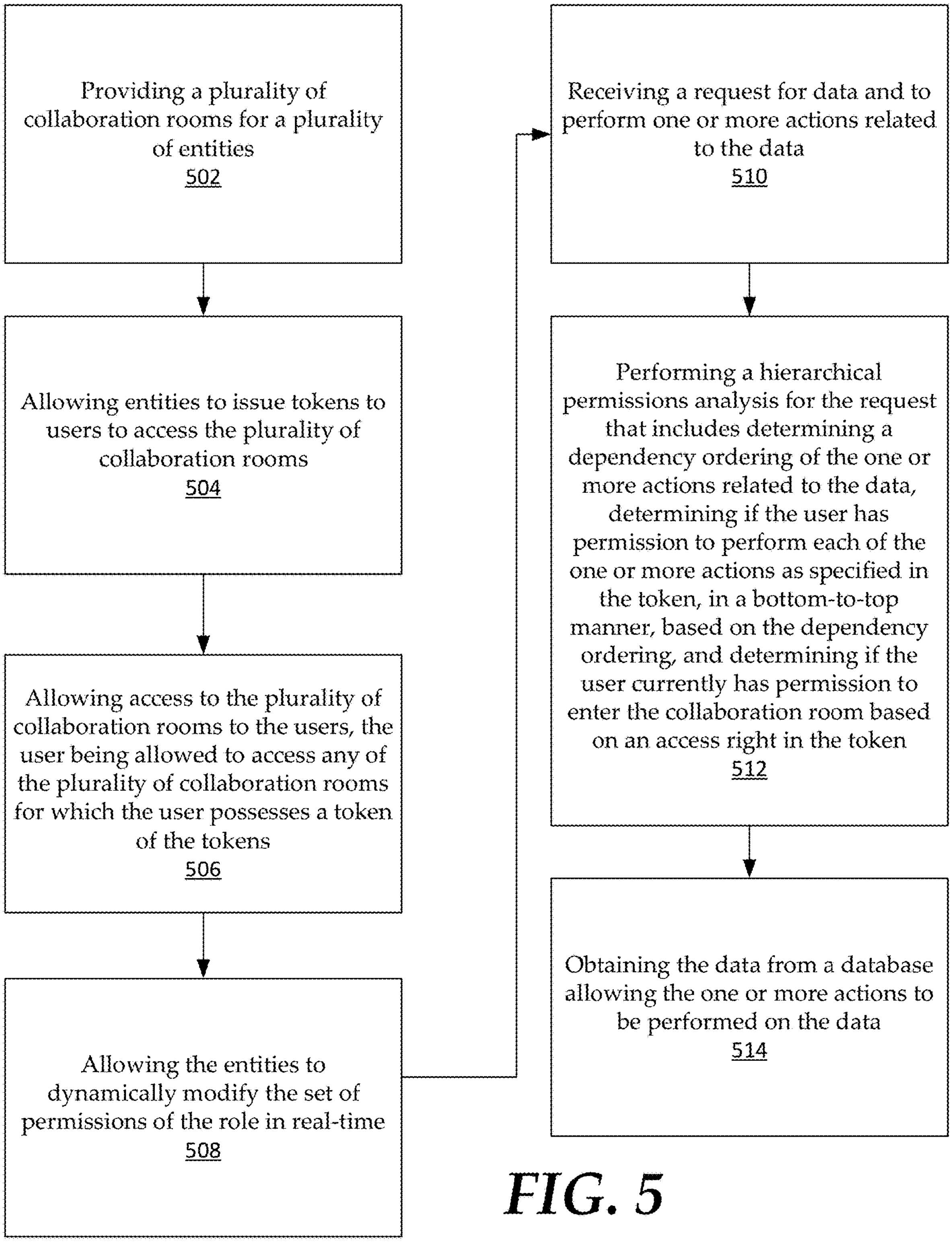
FIG. 5 is a flowchart of an example method of the present disclosure.

FIG. 5 is a flowchart of another example method of the present disclosure. The method can include a step 502 of providing a plurality of digital collaboration rooms for a plurality of entities. The method can also include a step 504 of allowing entities to issue tokens to users to access the plurality of digital collaboration rooms. Each user has been issued one of the tokens and each of the tokens comprises a tenant identifier that identifies one of the plurality of entities, a digital collaboration room identifier, and a role with a set of permissions.

The method includes a step 506 of allowing access to the plurality of digital collaboration rooms to the users, the user being allowed to access any of the plurality of digital collaboration rooms for which the user possesses a token of the tokens. Next, the method includes a step 508 of allowing the entities to dynamically modify the set of permissions of the role in real-time, as well as a step 510 of receiving a request for data and to perform one or more actions related to the data.

In some instances, the method can include a step 512 of performing a hierarchical permissions analysis for the request that includes determining a dependency ordering of the one or more actions related to the data, determining if the user has permission to perform each of the one or more actions as specified in the token, in a bottom-to-top manner, based on the dependency ordering, and determining if the user currently has permission to enter the digital collaboration room based on an access right in the token. Based on success of the hierarchical permissions analysis, the method includes a step 514 of obtaining the data from a database allowing the one or more actions to be performed on the data.

Figure 6:
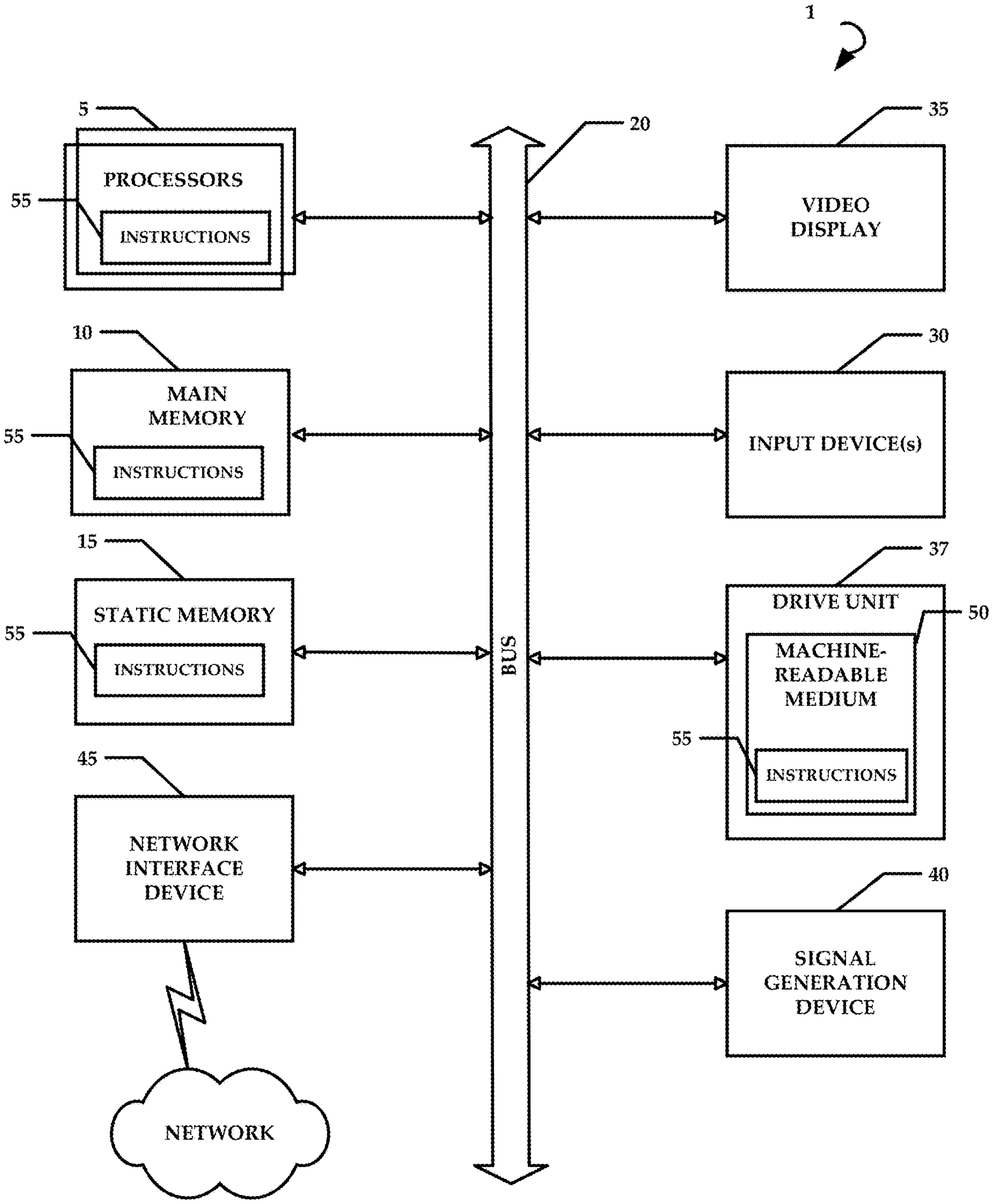
FIG. 6 is a schematic diagram of a computing system that is used to implement embodiments according to the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term “machine” shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term “computer-readable medium” should be taken to include a single medium or multiple media (e.g., a centralized or distributed database and/or associated caches and servers) that store the one or more sets of instructions. The term “computer-readable medium” shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term “computer-readable medium” shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

Facilitating Tabletop Exercises

As mentioned earlier, the exemplary system or platform is designed for conducting simulation exercises (also called tabletop exercises) in a secure manner using secure communication channels. As an example, the platform can be used by IT or security teams to collaborate with business teams and external providers. In certain embodiments, the platform is designed to be used by any stakeholder, and the platform can be a vehicle for dynamically hosting incident response plans and playbooks. Also, the platform can be a means for incident reporting for regulatory compliance. The platform can be utilized by an entity to run realistic crisis response exercises, and it allows an entity to assess gaps and improve incident response plans. By facilitating tabletop exercises using the exemplary platform, the participants can improve their crisis response awareness and decision-making on behalf of the entity. The tabletop exercises may also assist participants in understanding the regulatory response requirements and understanding their role and responsibilities, in the event that a real-life incident or crisis takes place. Finally, the platform is a means for testing communications and external coordination with business teams, external providers, and other stakeholders should an incident occur.

Figure 7:
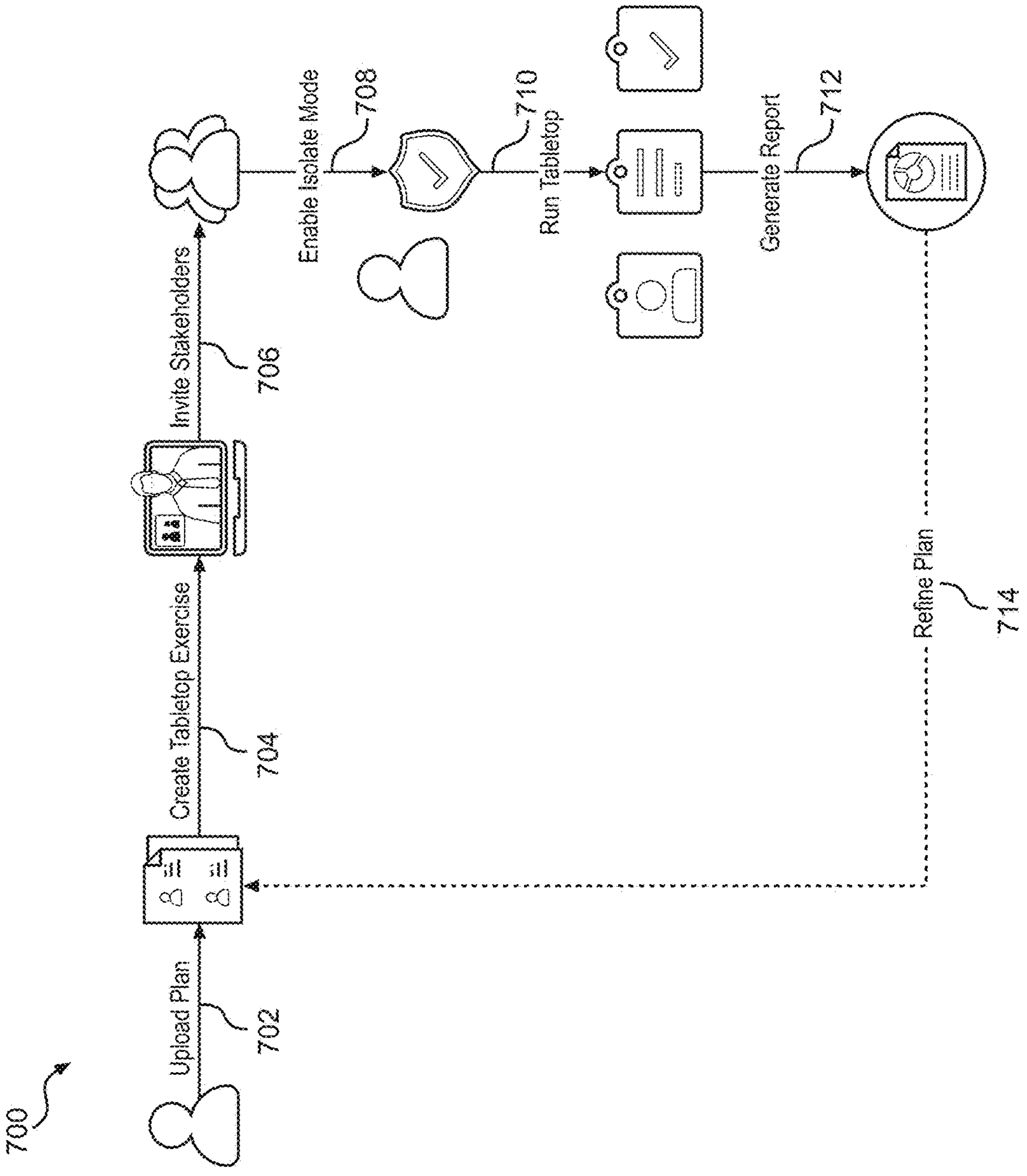
FIG. 7 is a flowchart of an example method for facilitating tabletop exercises.

FIG. 7 illustrates a method 700 for facilitating tabletop exercises using an exemplary out-of-band single platform. The exemplary platform can be implemented using the systems and methods embodiments described earlier herein, including, for example, the exemplary architecture of FIG. 1 and the computing system of FIG. 6. As discussed previously, in some embodiments, the exemplary platform can be separate from an entity's compromised and possibly disparate infrastructure platforms that may have been affected by an incident, such as a cyberattack.

Referring again to FIG. 7, the method 700 begins with step 702, when an entity or a user on behalf of an entity (such as a facilitator user) uploads an incident response (IR) plan onto the exemplary platform or system. As mentioned earlier, a facilitator (also known as a facilitator user) of the tabletop exercise can help guide participants of the tabletop exercise through one or more incident or crisis scenarios. Such scenarios are oftentimes simulations of real-life crises, such as cyberattacks. During the tabletop exercise, a facilitator can moderate discussions about how to address such scenarios, so that the participants can participate and respond to the scenarios as if the scenario were occurring in real-time and in real-life.

Referring still to FIG. 7, at step 704, the system creates a tabletop exercise based on the uploaded incident response plan. At step 706, stakeholders are invited to participate in the tabletop exercise via the exemplary platform. In some embodiments, the facilitator will invite stakeholders, or otherwise furnish the names and contact information of the stakeholders to the exemplary platform, so that the platform can transmit the invitations to the stakeholders accordingly. In other embodiments, the system, using machine learning and possibly with access to the entity's databases, can determine which stakeholders should be invited to participate in the tabletop exercise and proceed to do so without the assistance of the facilitator.

If an invited stakeholder accepts the invitation furnished by the platform, they become a participant of the tabletop exercise. The participant can log onto the exemplary platform or system. In some embodiments, the platform can be accessed via a mobile application that the participant can download, access, and log onto using their mobile phone or tablet. However, it will be understood by those skilled in the art that the platform can be accessed by any type of computing device associated with the participant, and access to the platform is not limited to merely mobile phones or tablets.

Once the participants have accepted the invitation to participate in the tabletop exercise, at step 708, an "isolate mode" of the exemplary platform is enabled to enhance security measures. The "isolate mode" can be activated by a facilitator. The facilitator may be a human facilitator, or the facilitator may be part of the exemplary platform that has developed a knowledgebase as to when the isolate mode should be activated.

When the isolate mode is activated, the orchestration service and/or the digital collaboration room (as described earlier herein) is isolated from other aspects, tools, corporate pieces, or services belonging to the entity. In some embodiments, the isolated orchestration service and/or the digital collaboration room are components of the platform that are isolated, removed or otherwise severed from the rest of the entity's ecosystem of corporate tools and services.

In other embodiments, activating an isolate mode and isolating the digital collaboration room further comprises severing any and all integrations on multiple levels with the digital collaboration room (such as the integrations of the digital collaboration room with any other portion of the entity's ecosystem), and blocking any further attempts of integrating the entity's ecosystem with the digital collaboration room. Further information about the isolate mode is provided in related application U.S. application Ser. No. 18/196,967, filed on May 12, 2023, titled "Systems and Methods for Providing Secure Access to Collaboration Rooms with Dynamic Tenancy in Response to an Event", which is incorporated by reference in its entirety as if fully set forth herein.

In some embodiments, once an event or an incident occurs, because the isolate mode has been activated (that is, the isolate mode is "on"), the participant or user is not automatically blocked. Instead, the user is notified that they can no longer use their corporate email to login to access the entity and the entity's corporate tools and the user is rerouted to another pathway. In other words, the orchestration service will try to actively handle the user experience of being rerouted to another pathway.

Referring still to FIG. 7, at step 710, the exemplary platform runs through the tabletop exercise or otherwise facilitates the tabletop exercise to be presented to the participants, typically under the guidance of the facilitator. The exemplary platform allows the participants to collaborate on the incident response plan during the tabletop exercise. In some embodiments the simulation of the tabletop exercise allows for participants to practice as a team on working through the incident response plan, and in doing so, the participants and/or the facilitator may identify improvements or changes that should be made to the incident response plan. The participants and/or the facilitator may discuss such improvements or changes to the incident response plan, or they may discuss aspects of the tabletop exercise, using a chat program or a secure conferencing capability of the exemplary platform.

In some embodiments, during the tabletop exercise, via the platform, the facilitator unveils or unlocks one or more injects to present simulations of run time scenarios to the participants, in order to measure the effectiveness of incident response plan and preparedness of the incident response team (that is, the participants of the tabletop exercise). An inject is defined as a simulation of a runtime scenario. In some embodiments, upon the completion of a first inject by the participants, the facilitator can unveil or unlock a second inject for the participants to view and respond to the scenario presented. Further examples of injects will be provided later herein.

Once the tabletop exercise has concluded, an after action report (AAR) is generated by the exemplary platform at step 712. The after action report is later distributed by the exemplary platform to the facilitator and the participants of the tabletop exercise, to provide meaningful insight, tips, and lessons about the tabletop exercise and the incident response plan that were utilized during the tabletop exercise. At step 714, the incident response plan (which was originally uploaded by the facilitator or the entity) is refined, based on the inputs that the system captures as part of the tabletop exercises and the outcomes of the tabletop exercise. In some embodiments, the refining of the incident response plan includes feedback provided by the system, which will be described in greater detail later herein.

Figure 8A:
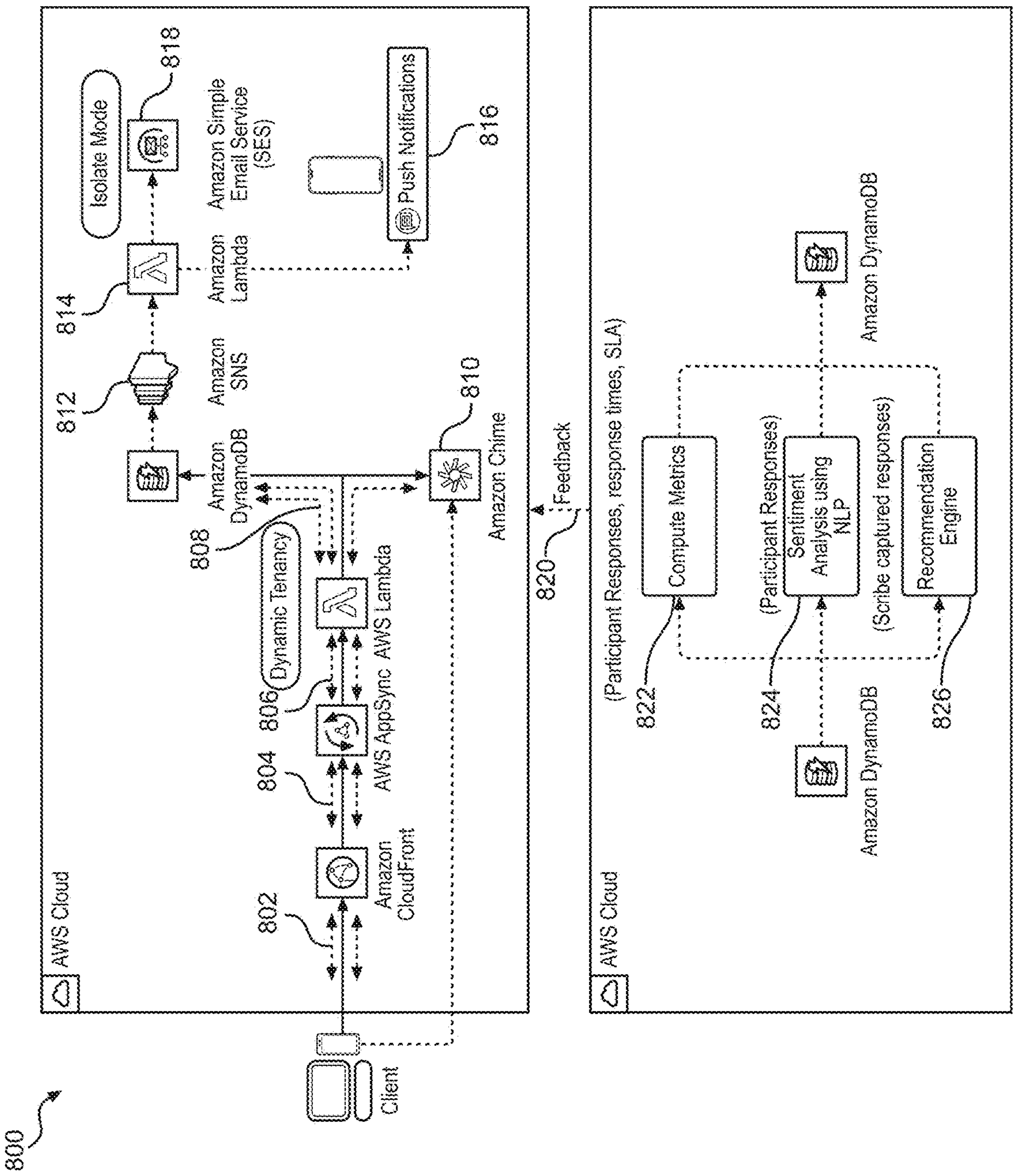
FIGS. 8A and 8B are flowcharts of example methods of the present disclosure related to facilitating tabletop exercises and providing feedback.
Figure 8B:
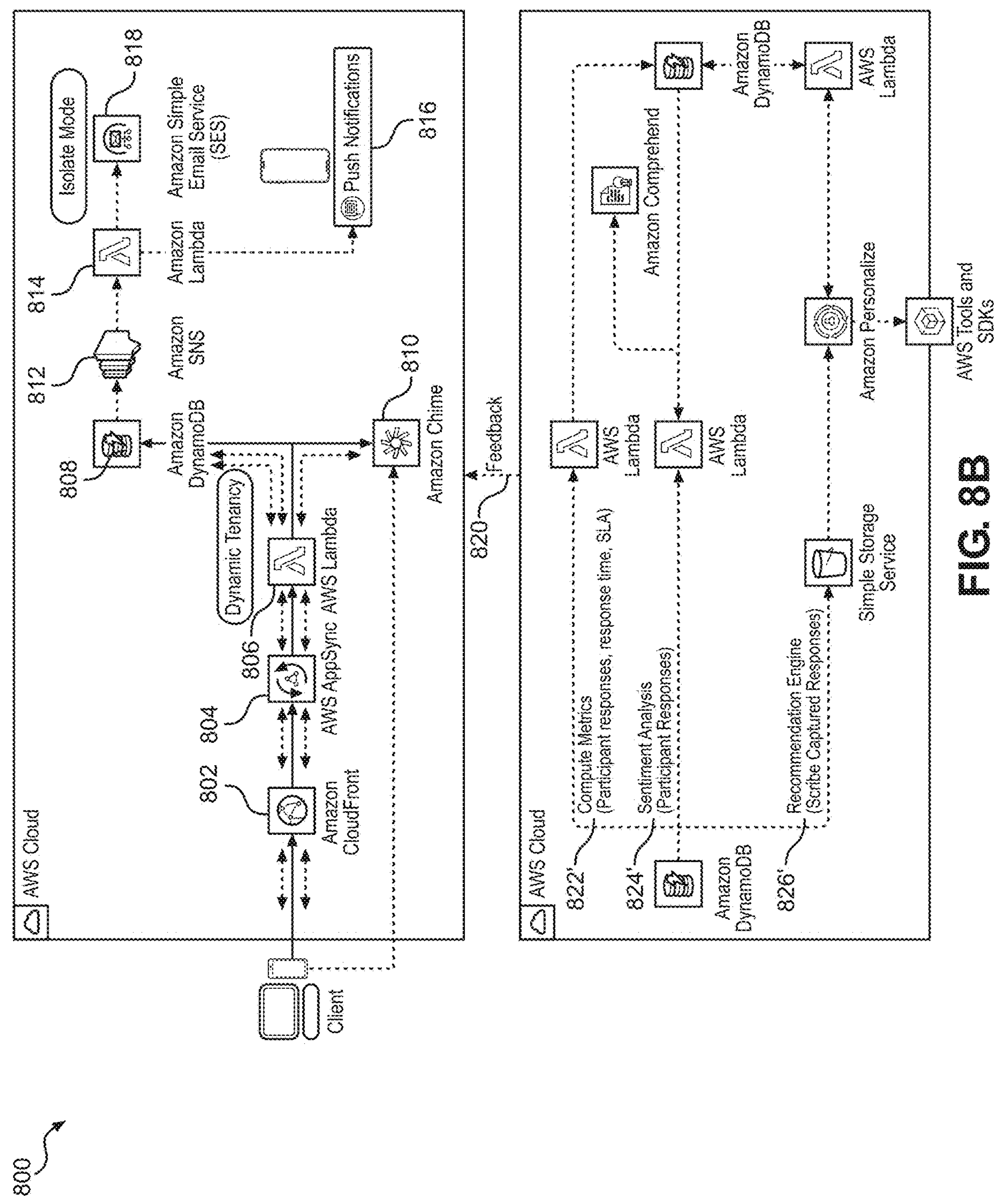

FIGS. 8A and 8B are flowcharts of example methods of the present disclosure related to facilitating tabletop exercises and providing feedback. FIG. 8A depicts a method 800 for facilitating tabletop exercises utilizing the exemplary single platform. The client (which may be the client computing device associated with the entity or a facilitator user) uploads an incident response plan onto the exemplary platform and transmits a request to the exemplary platform, requesting the platform to generate a tabletop exercise based on the incident response plan.

In response to the uploading of the incident response plan by the client, the exemplary platform captures the type of the incident response plan, and the exemplary platform also captures certain metadata. At steps 802, 804, and 806, the request from the client is transmitted to a content delivery network (such as Amazon Cloudfront), and then to a managed GraphQL service (such as AWS AppSync), which has endpoints that are further supported by a serverless compute service (such as AWS Lambda) within the platform. The serverless compute service is where the business logic of the platform resides.

At step 808, the platform generates a tabletop exercise and stores a record of the tabletop exercise in a database associated with the platform, such as Amazon DynamoDB. Similar to the client's total control and access of an incident response room (also known as a collaboration room) as described earlier herein, the client has total control and access of the tabletop exercise using the concept of dynamic tenancy. That is, the client is the owner of the data of the tabletop exercise. Vendors and third parties do not own the data of the tabletop exercise. Instead, the client invites vendors and third parties to participate in the tabletop exercise using the same dynamic tenancy model as the collaboration room as described earlier herein.

During a tabletop exercise, the facilitator can lock or unlock one or more injects. An inject is a simulation of a runtime scenario that is used during a tabletop exercise. Initially, the facilitator creates a pipeline of injects with the platform's assistance. When an inject is in the locked state, none of the participants can view the inject; that is, only the facilitator can view the locked inject. As the tabletop exercises progress, the facilitator can unveil or unlock one or more injects for the participants to access. When an inject is in the unlocked state, the participants can also view the details of the inject. The inject presents a new scenario for the participants to review and analyze.

During the tabletop exercise, the facilitator can ask the participants questions associated with the inject, such as what is the next step to be taken to address the incident at hand. At this point, the participants have the ability to respond to the facilitator's questions, the participants can work as a team in a brainstorming exercise to assess the scenario presented in the inject, and during the tabletop exercise, the participants also have the ability to invite more people (such as other third parties or vendors) to the collaboration room. Once the inject is resolved, then the facilitator can unlock the next inject. The unlocking of the next inject can be done by the human facilitator, or by the system itself due to the system's machine learning to dynamically unlock the next inject or generate and introduce a new inject during the tabletop exercise.

At step 810, in some embodiments, the participants are invited to the tabletop exercise by the exemplary platform and can join the conference call via a secure communications service. The conferencing facility of the exemplary platform is implemented using the secure communications service (such as Amazon Chime), so that participants on the exemplary platform can converse with each other and with the facilitator about the tabletop exercises and the one or more injects that are unlocked and accessible to the participants. Also, participants can provide responses to the injects or to the questions posed by the facilitator via the exemplary platform. Those responses are captured and analyzed by the exemplary platform, to later create the after action report that will be distributed to the participants and facilitator. Also, those responses can be utilized by one or more machine learning models of the exemplary platform which will be described below, in order to provide feedback to the exemplary platform and refine the incident response plan.

At steps 812-818, a notification flow of the method 800 occurs. Specifically, with the help of a managed messaging service for communication (such as Amazon SNS), a serverless compute service (such as AWS Lambda) where the business logic of the platform resides, and an email service (such as Amazon Simple Email Service), in order to simulate a real-life incident or crisis scenario, the facilitator can activate or turn on "isolate mode" for that particular tenant where the tabletop exercise is being carried out. When the "isolate mode" is turned on, all the emails are routed to the backup emails of the participants and not to the organization/entity email. That is, at steps 816 and 818, with the "isolate mode" activated, push notifications and email communications are sent to the backup emails of the participants. This re-routing of push notifications and emails allows for the participants to practice the incident response plan, as if they are responding to a real-life, dynamic incident, such as an active cyber crisis during which the organization/entity email server has been compromised and is therefore inaccessible to the participants.

At step 820, the system generates feedback. The system's feedback can be incorporated by the platform to refine or otherwise improve the incident response plan and/or the tabletop exercise for future use. The system has three engines or models for generating feedback, namely, the compute metrics model, the sentiment analysis model, and the recommendation model. In some embodiments, one or more of the compute metrics model, the sentiment analysis model, and the recommendation model comprise a machine learning model.

At step 822, using the compute metrics model and by measuring participants' responses, participants' response times, and service level agreement (SLA) response times, the system can determine four attributes. First, the system can determine the mean response time which measures how much time elapsed for a participant to respond to a particular inject during the tabletop exercise. The system can measure the responses made by the participant during the tabletop exercise. The system can capture the participant's response time, since the system has an activity log. That is, the system can log when the participant starts an inject (start time) and when the participant ends the inject (end time). The difference between the start time and end time measures the participant's response time. In other words, the participant's response time can be measured by measuring the time between injects.

Second, with the compute metrics model, the system can also capture any variation between actual response time versus SLA response time (stipulated or guaranteed time to respond to an incident, as provided by the service level agreement (SLA)). In other words, the system determines whether the participant or the team of participants that engaged in the tabletop exercise can respond to an incident within the stipulated SLA response time, and whether the participant(s) need more time beyond the stipulated SLA response time.

Third, using the compute metrics model, the system can measure a participant engagement quotient. From the total number of participants of the tabletop exercise, the system can determine how many participants actually participated by responding to an inject. This type of information provides valuable feedback to the facilitator to determine which people need to be engaged by the facilitator, in order to ensure the success of the tabletop exercise.

Finally, using the compute metrics engine, the engine can determine the preparedness quotient. By measuring the preparedness quotient, the system can answer whether all the levels of service have been defined by the service level agreement and met by the team of participants, how prepared the team of participants is to respond to an incident, and what needs to be done in order to ensure that the participants are prepared to respond to an incident.

Figure 11A:
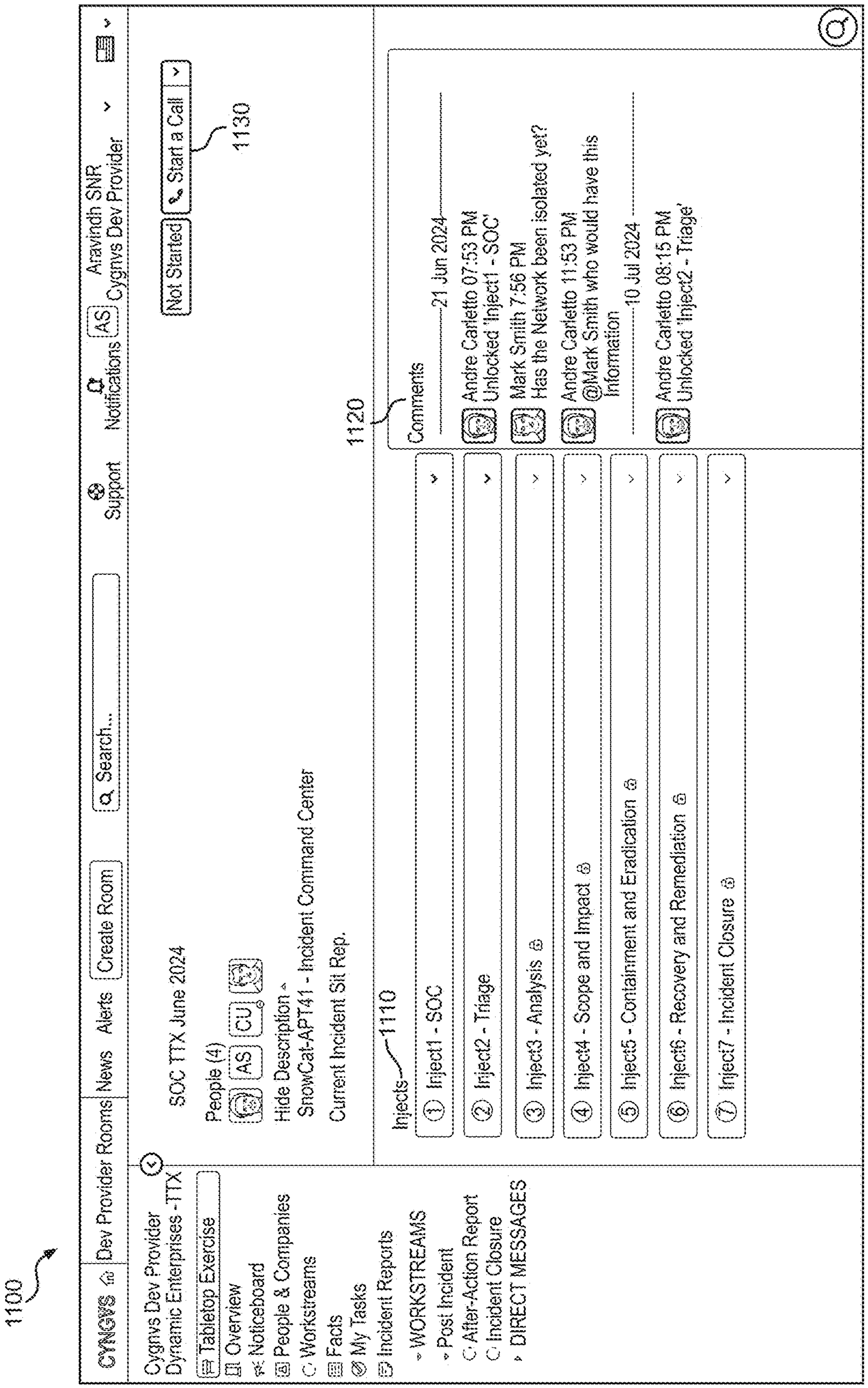
FIGS. 11A and 11B are exemplary screenshots of a participant's dashboard user interface during a tabletop exercise.
Figure 11B:
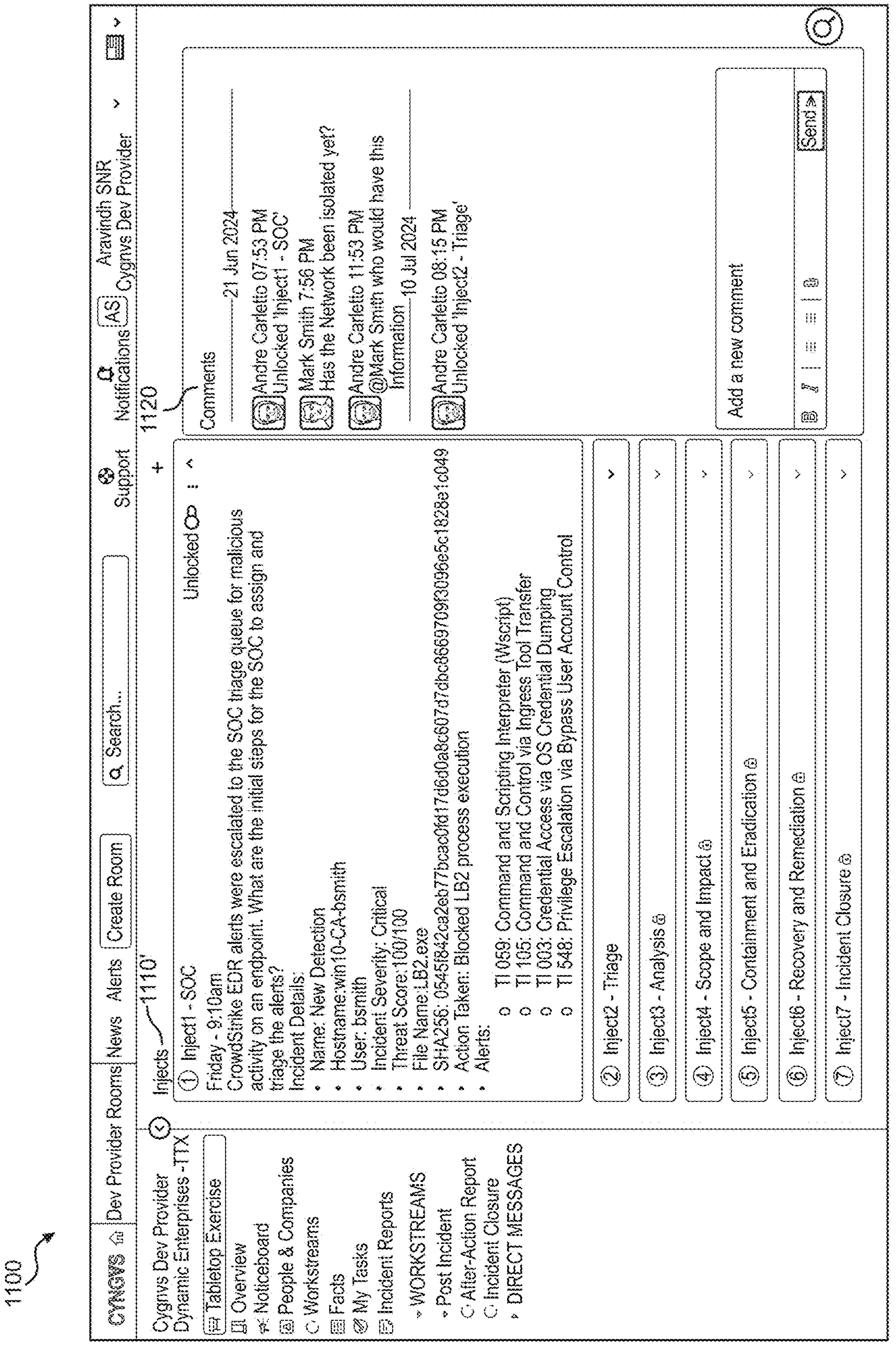

At step 824, a sentiment analysis model processes participants' responses in order for the system to generate feedback. The sentiment analysis engine uses natural language processing (NLP) to analyze a participant's comments and responses that the participant made during the tabletop exercise. Those comments and responses can be provided by the participant, via text (by way of a comment box 1120 as depicted in FIGS. 11A and 11B) or via the secure communications channel (such as the participant's words made during a conference call using a conference feature 1130 depicted in FIG. 11A). The system captures the participant's comments and responses made during the tabletop exercise. Later, the system can determine whether the sentiment of the participant's comments is positive, negative, mixed or neutral. Also, the sentiment analysis engine can determine whether a participant perceived that the tabletop exercise is easy or difficult.

The sentiment analysis engine can also determine entity recognition, which means that the system can understand the context of a participant's comment. The system can determine if the participant's comment is about an entity such as an inject, a work stream, or an incident, and the system can also relate a sentiment to the particular entity.

Further, the sentiment analysis engine can make a determination of effort levels. The sentiment can be one relating to complexity and frustration. For instance, frustration can arise when the incident response plan does not have the necessary steps outlined to provide a participant with the necessary knowledge to implement a robust response to an incident. If the incident response plan has missing steps, particularly if the incident response plan has some complexity, this in turn may cause uncertainty on the part of a participant, since the participant will believe they are unable to appropriately respond to an incident. The determination that the sentiment is frustration can mean that the incident response plan needs to be refined or that the incident response plan needs to be amended to include the missing steps.

At step 826, a third model called the recommendation engine or recommendation model processes a scribe's captured responses for the system to generate feedback. A scribe can be human or can be a computing machine, and the scribe's role is to take notes during tabletop exercises. The system has an activity log of every event that has happened and who did what action during the tabletop exercise. Using these data points, the system can determine what next steps are needed when a real-life incident occurs. In other words, the recommendation model can identify gaps in the incident response plan and provide recommendations. Thus, a participant's actions during a tabletop exercise can be used as a training data set for the recommendation engine. Using this training data set, the system can make recommendations during a real-life incident, or the system can validate the recommendations using the current incident response plan, to see whether all the recommended actions are already listed as part of the incident response plan. If at least one of the recommended actions recommended by the recommendation engine is missing from the incident response plan, then the missing recommendation actions are added to the incident response plan so that the next time a tabletop exercise is conducted, it will be easier for participants to proceed with the recommended actions as set forth in the updated incident response plan.

It should be noted that in some embodiments, the recommendation model or engine will analyze the entire universe of captured responses of the scribe. In other embodiments, the recommendation engine will analyze the captured responses of the scribe for a single client. Also, it is noteworthy that the present disclosure encompasses embodiments where the scribe and/or the recommendations are automated features of the system itself.

FIG. 8B depicts a method 800 for facilitating tabletop exercises utilizing the exemplary single platform. FIG. 8B is very similar to FIG. 8A. However, in FIG. 8B, the exemplary implementations of the compute metrics model, the sentiment analysis model, and the recommendation model are depicted. At step 822', the determination and measurement of certain metrics using participant responses, response times, and SLA response times by the compute metrics ML model can be implemented using the AWS Lambda and then stored in a database such as AmazonDynamoDB. At step 824', the determination of sentiment based on a participant's responses during a tabletop exercise can be accomplished by leveraging AWS Lambda and Amazon Comprehend. Amazon Comprehend can aid in entity recognition and sentiment analysis. Amazon Comprehend can determine the entity based on the sentence of the response used. At step 826', the recommendation engine generates recommendations by leveraging a machine learning (ML) service, such as Amazon Personalize. Based on a machine learning model, the recommendation engine can make recommendations of what the next best actions are to respond to an incident. The recommendation engine can then provide those recommendations in a ranked fashion. The recommendations can be based on personas. A persona is a combination of an incident type, department, and role, all of which are actual entities already determined by the system.

Figure 9A:
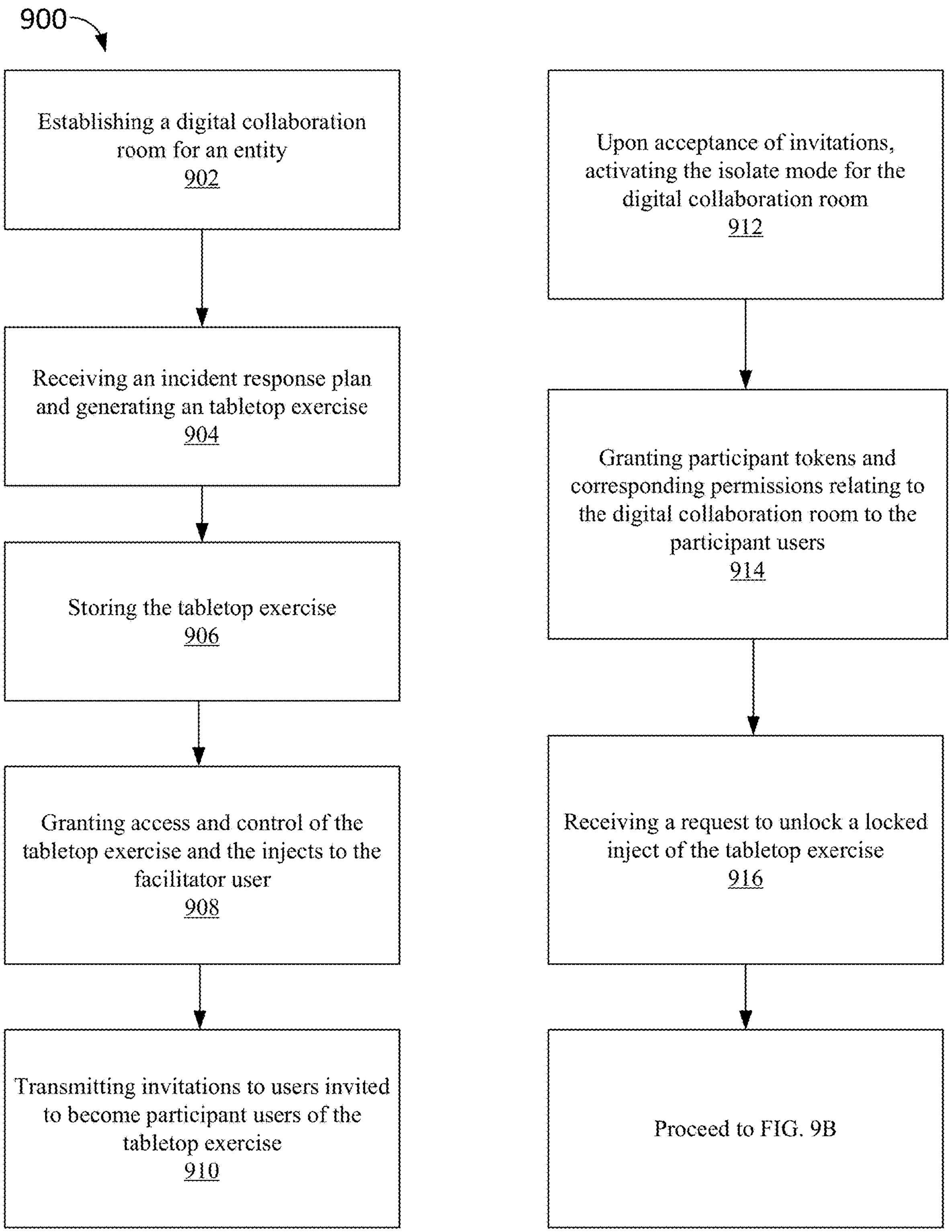
FIGS. 9A and 9B are flowcharts of an example method related to facilitating tabletop exercises using collaboration rooms with dynamic tenancy.
Figure 9B:
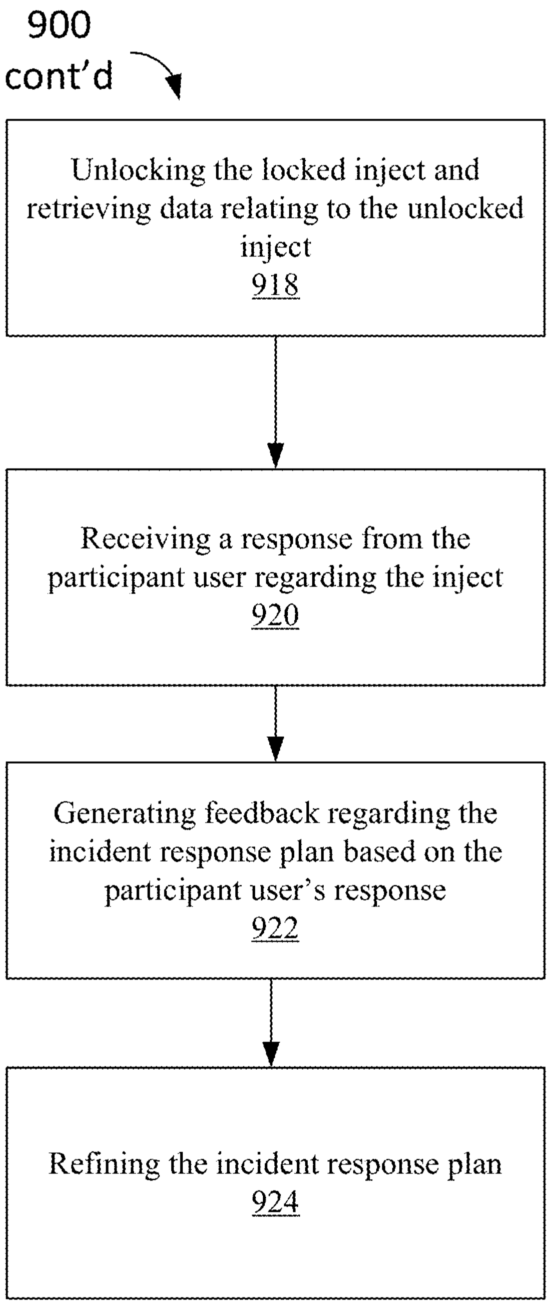

FIGS. 9A and 9B depict a flowchart of an example method related to facilitating tabletop exercises using collaboration rooms with dynamic tenancy. At step 902, a digital collaboration room (also known as an incident room) is established for an entity, via an orchestration service, as earlier described above. The entity has control to grant permissions to users regarding the digital collaboration room and to dynamically modify permissions of the users in real time. The orchestration service may comprise a cloud resource where the digital collaboration room, owned by the entity, is hosted and made accessible to the users. Entities can issue tokens to users in order for the users to access the plurality of digital collaboration rooms. Each user may be issued one of the tokens and each of the tokens comprises a tenant identifier that identifies one of the plurality of entities, a digital collaboration room identifier, and a role with a set of permissions. In some embodiments, the tabletop exercise is executed or run through in the digital collaboration room. As an example, a facilitator user who moderates the tabletop exercise may be granted different permissions relating to the collaboration room in comparison with a participant user of the tabletop exercise.

At step 904, an incident response plan is received. In some embodiments, the incident response plan is received by the entity tenant or by the facilitator user on behalf of the entity tenant. The incident response plan is uploaded onto the exemplary platform. Based on the incident response plan, a tabletop exercise is generated by the exemplary platform. The tabletop exercise has one or more injects. Each inject is a simulation of a runtime scenario, and each inject can be either locked or unlocked. In some embodiments, the inject is locked or unlocked at the command of the facilitator user. At step 906, the tabletop exercise is stored in a database associated with the collaboration room. At step 908, access and control of the tabletop exercise and the injects is granted to the facilitator user, who moderates participant users during an execution or running of the tabletop exercise on the exemplary platform. At step 910, invitations are transmitted to users who are invited to become a participant user of the tabletop exercise. In some embodiments, the facilitator (on behalf of the entity tenant) will invite stakeholders, or otherwise furnish the names and contact information of the stakeholders to the exemplary platform, so that the platform can transmit the invitations to the stakeholders accordingly. Those stakeholders may include external providers or vendors. In other embodiments, the system, using machine learning and with access to the entity's databases, can determine which stakeholders should be invited to participate in the tabletop exercise and proceed to do so without the assistance of the facilitator.

At step 912, upon receiving acceptance of the invitations by the one or more users to become a participant user, an isolate mode for the collaboration room is activated. During the isolate mode, participant users are notified or re-routed to access the collaboration room by way of the participant user's backup email account. That is, participant users are prohibited from accessing the collaboration room using their email account with the entity (which is sometimes referred to as the user's corporate email account).

At step 914, participant tokens and corresponding permissions relating to the collaboration room are granted to the participant user. At step 916, a request from the facilitator user to unlock a locked inject of the tabletop exercise is received. In response to the request, the locked inject is unlocked at step 918, and data relating to the unlocked inject is retrieved from the database for the digital collaboration room. By unlocking the previously locked inject, the system grants the participant user with access to the data relating to the unlocked inject.

At step 920, a response from the participant user is received regarding the data relating to the inject. At step 922, based on the response from the participant user, feedback is generated regarding the incident response plan. The feedback can be obtained from a recommendation machine learning model that is trained to identify gaps in the incident response plan and provide recommendations to improve the incident response plan. At step 924, the incident response plan is refined by the exemplary platform. The refinements are based on the response received from the participant user and the generated feedback.

In some embodiments, following the completion of the tabletop exercise, an after action report is generated and distributed to the facilitator and the participants of the tabletop exercise regarding the tabletop exercise and the incident response plan. The after action report may provide meaningful insight, tips, and lessons about the tabletop exercise and the incident response plan that were utilized during the tabletop exercise.

The tabletop exercise may include a plurality of injects, such as a first inject and a second inject. In some embodiments, upon the completion of a first inject by the participants, the facilitator can unveil or unlock a second inject for the participants to view and respond to the scenario presented. In some embodiments, upon the completion of the first inject by the participant user, the system locks the first inject so that the participant users can no longer access data relating to the first inject, and the system also unlocks the second inject so that the participant users can access data relating the second inject. The locking of the first inject and the unlocking of the second inject can be initiated by a request from the facilitator user or the entity.

The feedback that is generated by the exemplary platform can come from the compute metrics engine, the sentiment analysis engine and/or the recommendation engine, which are depicted in FIGS. 8A and 8B. In some embodiments, the generated feedback regarding the incident response plan includes feedback from a compute metrics engine that is based on measuring a participant user's responses, a participant's response time, and a service level agreement (SLA) response time. Such feedback may include on or more of the following: a determination of a mean response time of the participant user, based on how much time elapsed for the participant user to respond to an inject during the tabletop exercise; a determination of any variation between actual response time versus service level agreement (SLA) response time; a measurement of a participant engagement quotient, based on a number of participant users who provide responses to an inject and a total number of participant users of the tabletop exercise; and a measurement of a preparedness quotient, to determine how prepared the participant user is to respond to an incident.

In some embodiments, the generating of the feedback includes processing a capture, made by a scribe, of the participant user's response during the tabletop exercise. The scribe's role in the tabletop exercise is to take notes or otherwise capture the responses and actions of the participant user that are made during the tabletop exercise. The captured participant user's responses can be used as a training data set for the recommendation machine learning model. Once the recommendation machine learning model is trained, it can provide new recommendations, and it can validate its previous or current recommendations regarding the incident response plan.

In other embodiments, the generated feedback is obtained from a sentiment analysis model, which is configured to process a participant user's responses by using natural language processing (NLP) to analyze the participant's responses made during the tabletop exercise. The sentiment analysis model can also be further configured to determine entity recognition and relate a sentiment to the entity. The sentiment analysis model may also be further configured to determine effort levels.

Figure 10A:
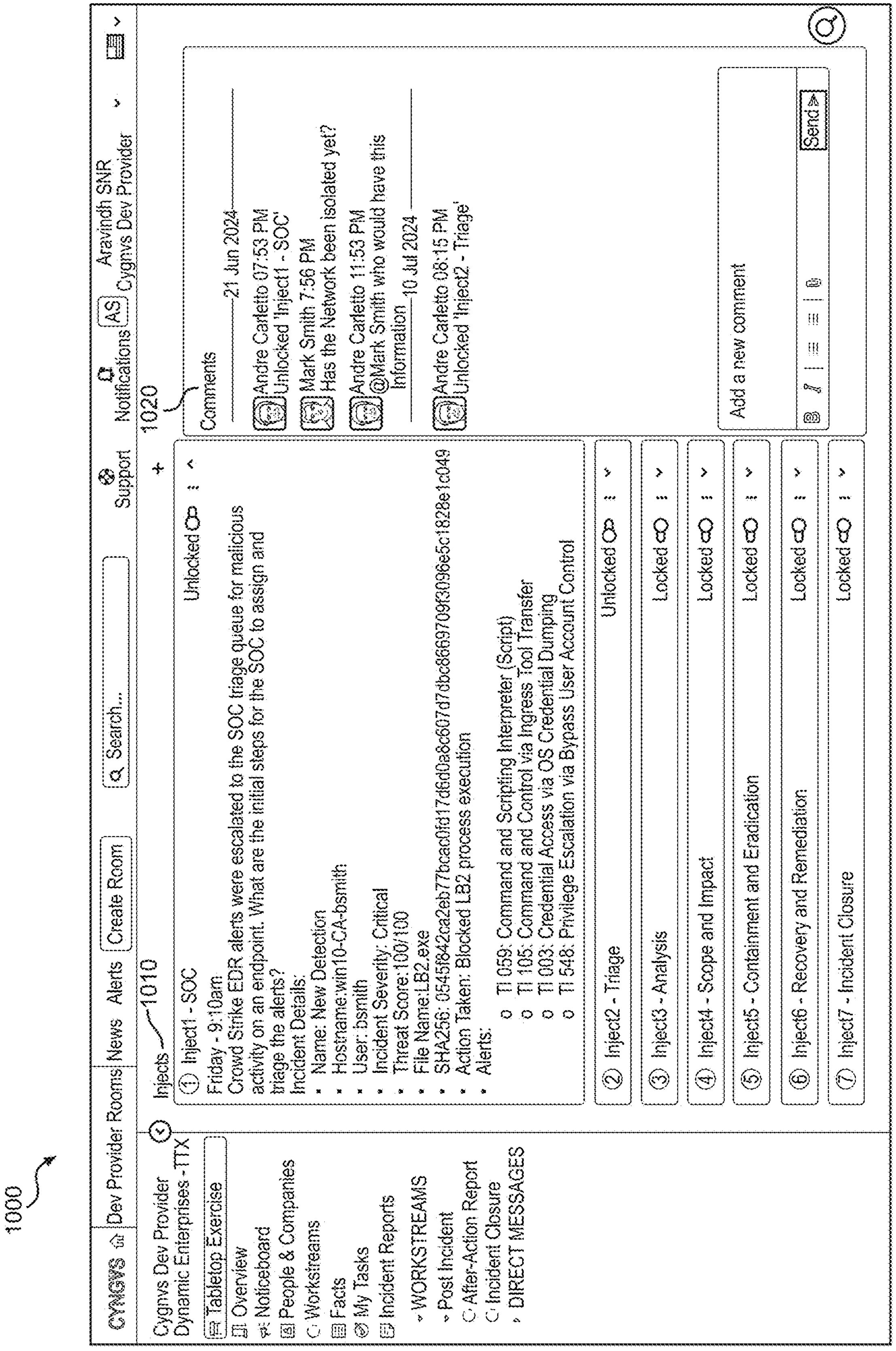
FIGS. 10A and 10B are exemplary screenshots of a facilitator's dashboard user interface during a tabletop exercise.
Figure 10B:
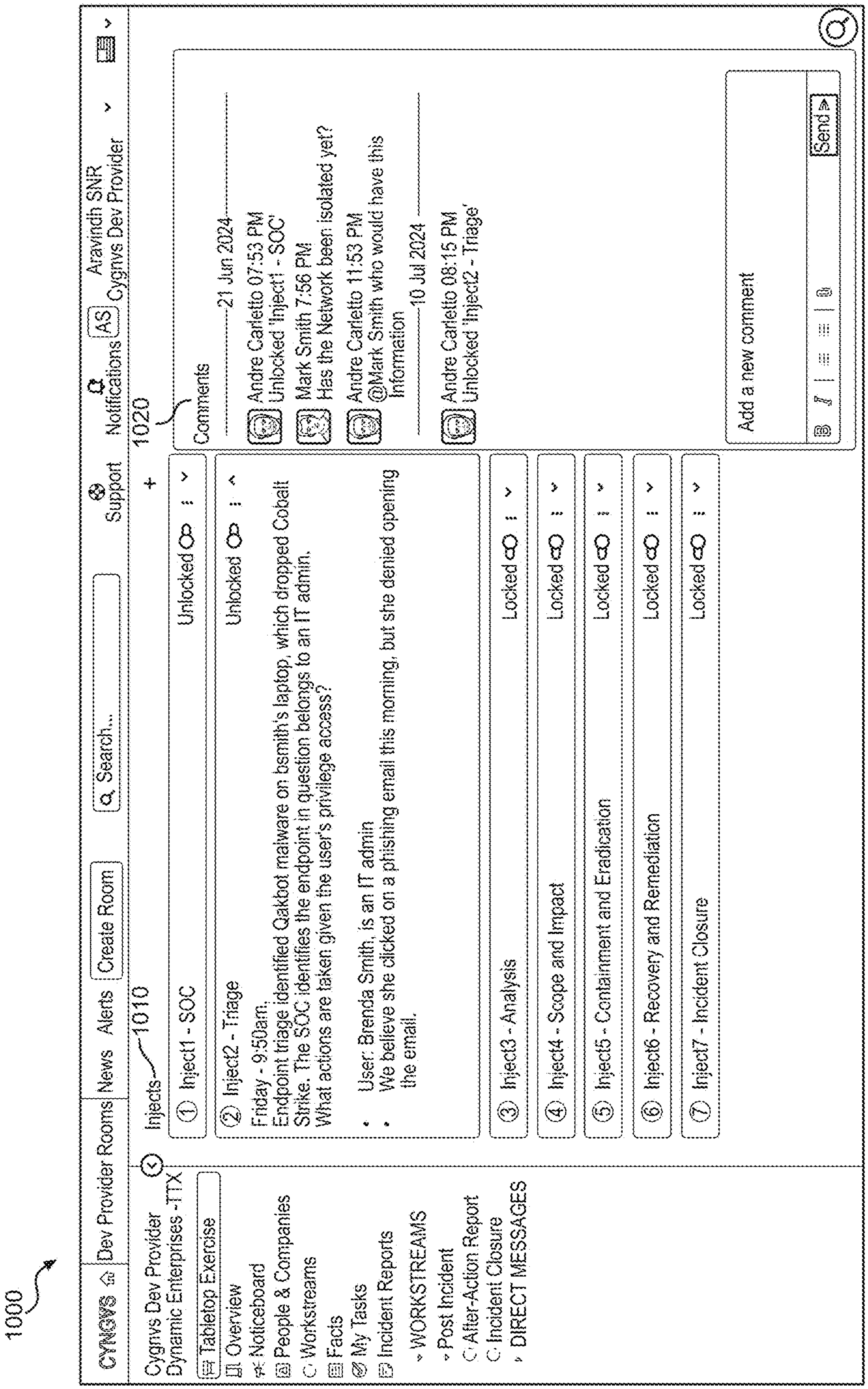

FIGS. 10A and 10B are exemplary screenshots of a facilitator's dashboard user interface during a tabletop exercise. FIG. 10A shows a dashboard 1000 of a facilitator using the exemplary platform upon the initiation of a tabletop exercise. The dashboard 1000 displays one or more injects 1010 from the view of the facilitator. The one or more injects 1010 will be shown to participants of the tabletop exercise during the running of the tabletop exercise. Specifically, the dashboard 1000 in the example provided by FIG. 10A depicts a first inject entitled "Inject 1-SOC" which the facilitator has unlocked or otherwise unveiled to the participants during the tabletop exercise, so that the participants can access, view and respond to the details presented in the first inject. It should be noted that by adding comments in a comment box 1020, participants and the facilitator can communicate with one another during the tabletop exercise. In the example provided in FIG. 10A, the exemplary comment box 1020 shows that a facilitator (named Andre Carletto) has commanded the exemplary platform to unlock "Inject 1-SOC" and has also asked a question to a participant (named Mark Smith) about the first inject. Furthermore, the participants' responses and the facilitator's comments made in the comment box 1020 can be utilized by one or more of the compute metrics engine, the sentiment analysis engine, and the recommendations engine, as datasets for providing feedback back to the platform.

FIG. 10B also shows an example dashboard 1000 of a facilitator using the exemplary platform upon the unlocking of a second inject of a tabletop exercise. The dashboard 1000 displays one or more injects 1010 from the view of the facilitator. The one or more injects 1010 will be shown to participants of the tabletop exercise during the running of the tabletop exercise. Specifically, the dashboard 1000 in the example provided by FIG. 10B depicts a second inject entitled "Inject 2-Triage" which the facilitator has unlocked or otherwise unveiled to the participants after the first inject (depicted in FIG. 10A) has been completed during the tabletop exercise, such that the participants can now view the details presented in the unlocked second inject. Like FIG. 10A, FIG. 10B also displays the other injects (Injects 3 through 7) listed below the second inject. By adding comments in a comment box 1020, participants and the facilitator can communicate with one another during the tabletop exercise. As shown in the last comment of the exemplary comment box 1020 presented in FIG. 10B, a facilitator (named Andre Carletto) has commanded the exemplary platform to unlock "Inject 2-Triage" which caused the platform to display the unlocked details of the second inject to the participants. The participants' responses and the facilitator's comments made in the comment box 1020 can be utilized by one or more of the compute metrics engine, the sentiment analysis engine, and the recommendations engine, as datasets for providing feedback back to the platform.

FIGS. 11A and 11B are exemplary screenshots of a participant's dashboard user interface during a tabletop exercise. FIG. 11A shows a dashboard 1100 of a participant using the exemplary platform upon the initiation of a tabletop exercise. The dashboard 1100 displays one or more injects 1110 from the view of the participant, which are all currently locked at the start of the tabletop exercise and therefore no details of the injects can be viewed by the participant, other than the titles of the injects. These one or more injects 1110 will eventually be unveiled by the facilitator or otherwise shown to the participant of the tabletop exercise during the running of the tabletop exercise. Specifically, the dashboard 1100 in the example provided by FIG. 11A depicts only the title of a first inject (namely, "Inject 1-SOC"), which has not yet been unlocked by the facilitator. It should be noted that by adding comments in a comment box 1120 provided by the exemplary platform, the participants and the facilitator can communicate with one another during the tabletop exercise. Further, the participant's dashboard 1100 includes a secure conference call feature 1130, which can be utilized by the participants and the facilitator as a means of communication during the tabletop exercise via the exemplary platform. Again, the participants' responses and the facilitator's comments made in the comment box 1120 or via the conference call feature 1130 can be utilized by one or more of the compute metrics engine, the sentiment analysis engine, and the recommendations engine, as datasets for providing feedback back to the platform.

FIG. 11B also shows an example dashboard 1100 of a participant using the exemplary platform upon the unlocking of a first inject of a tabletop exercise. The dashboard 1100 displays one or more injects 1110' from the view of the participant. The one or more injects 1110' may eventually be unveiled by the facilitator or otherwise shown to the participant of the tabletop exercise during the running of the tabletop exercise. Specifically, the dashboard 1100 in the example provided by FIG. 11B depicts only the title and details of the first inject "Inject 1-SOC," which has been unlocked by the facilitator and can be viewed by the participant. However, the dashboard 1100 also shows that the other injects listed below Inject 1 (namely, Injects 2 through 7) are all still locked and therefore no details of those specific injects can be viewed nor accessed by the participant, other than the titles of the injects. It should be noted that by adding comments in a comment box 1120 provided by the exemplary platform, the participants and the facilitator can communicate with one another during the tabletop exercise. Again, the participants' responses and the facilitator's comments made in the comment box 1120 or via the conference call feature 1130 can be utilized by one or more of the compute metrics engine, the sentiment analysis engine, and the recommendations engine, as datasets for providing feedback back to the platform.

What is claimed is:

1. A method comprising:

establishing, via an orchestration service, a digital collaboration room for an entity, the entity having control to grant permissions to users regarding the digital collaboration room and to dynamically modify permissions of the users in real time, the orchestration service being a cloud resource where the digital collaboration room, owned by the entity, is hosted and made accessible to the users;

receiving, from the entity, an incident response plan;

based on the incident response plan, generating a tabletop exercise having one or more injects, each inject comprising a simulation of a runtime scenario, each inject being locked or unlocked;

storing the tabletop exercise in a database;

granting access and control of the tabletop exercise and the injects to a facilitator user, the facilitator user further configured to moderate participant users during an execution of the tabletop exercise;

transmitting invitations to one or more users that are invited to become a participant user of the tabletop exercise;

upon receiving acceptance of the invitations by the one or more users to become the participant user, activating an isolate mode for the digital collaboration room, in which the participant user is notified or re-routed to access the digital collaboration room by way of the participant user's backup email account;

granting participant tokens and corresponding permissions relating to the digital collaboration room to the participant user;

receiving a request from the facilitator user to unlock a locked inject of the tabletop exercise;

unlocking the locked inject and retrieving data relating to the unlocked inject from the database for the digital collaboration room, thereby granting access to the data relating to the unlocked inject to the participant user;

receiving a response from the participant user regarding the data relating to the unlocked inject;

based on the response from the participant user, generating feedback regarding the incident response plan, the feedback obtained from a recommendation machine learning model trained to identify gaps in the incident response plan and provide recommendations to improve the incident response plan; and refining the incident response plan based on the response from the participant user and the generated feedback.

2. The method according to claim 1, wherein the tabletop exercise comprises a first inject and a second inject.

3. The method according to claim 2, the method further comprising:

upon completion of the first inject by the participant user, locking the first inject so that the participant user can no longer access data relating to the first inject; and unlocking the second inject so that the participant user can access data relating to the second inject.

4. The method according to claim 3, wherein the locking of the first inject and the unlocking of the second inject are initiated by a request from the facilitator user.

5. The method according to claim 1, further comprising generating and distributing an after action report to the facilitator user and the participant users of the tabletop exercise regarding the tabletop exercise and the incident response plan.

6. The method according to claim 1, wherein the generated feedback regarding the incident response plan further comprises feedback from a compute metrics engine that is based on measuring the participant user's responses, the participant user's response time, and a service level agreement (SLA) response time.

7. The method according to claim 6, wherein the generated feedback from the compute metrics engine further comprises at least one of:

a determination of a mean response time of the participant user, based on how much time elapsed for the participant user to respond to the inject during the tabletop exercise;

a determination of any variation between actual response time versus service level agreement (SLA) response time;

a measurement of a participant engagement quotient, based on a number of participant users who provide responses to the inject and a total number of participant users of the tabletop exercise; and a measurement of a preparedness quotient, to determine how prepared the participant user is to respond to an incident.

8. The method according to claim 1, wherein generating feedback regarding the incident response plan further comprises:

processing a capture, by a scribe, of the participant user's response during the tabletop exercise; and based on the captured participant user's response as a training data set for the recommendation machine learning model, obtaining the recommendations from the recommendation machine learning model and validating the recommendations from the recommendation machine learning model regarding the incident response plan.

9. The method according to claim 1, wherein generating feedback comprises generating feedback from a sentiment analysis model configured to process the participant user's responses by using natural language processing (NLP) to analyze the participant user's responses made during the tabletop exercise.

10. The method according to claim 9, wherein the sentiment analysis model is further configured to determine entity recognition and relate a sentiment to the entity.

11. The method according to claim 9, wherein the sentiment analysis model is further configured to determine effort levels.

12. A system comprising:

a processor and memory for storing executable instructions, the processor executing the instructions to:

establish, via an orchestration service, a digital collaboration room for an entity, the entity having control to grant permissions to users regarding the digital collaboration room and to dynamically modify permissions of the users in real time, the orchestration service being a cloud resource where the digital collaboration room, owned by the entity, is hosted and made accessible to the users;

receive, from the entity, an incident response plan;

based on the incident response plan, generate a tabletop exercise having one or more injects, each inject comprising a simulation of a runtime scenario, each inject being locked or unlocked;

store the tabletop exercise in a database;

grant access and control of the tabletop exercise and the injects to a facilitator user, the facilitator user further configured to moderate participant users during an execution of the tabletop exercise;

transmit invitations to one or more users that are invited to become a participant user of the tabletop exercise;

upon receiving acceptance of the invitations by the one or more users to become the participant user, activate an isolate mode for the digital collaboration room, in which the participant user is notified or re-routed to access the digital collaboration room by way of the participant user's backup email account;

grant participant tokens and corresponding permissions relating to the digital collaboration room to the participant user;

receive a request from the facilitator user to unlock a locked inject of the tabletop exercise;

unlock the locked inject and retrieve data relating to the unlocked inject from the database for the digital collaboration room, thereby granting access to the data relating to the unlocked inject to the participant user;

receive a response from the participant user regarding the data relating to the unlocked inject;

based on the response from the participant user, generate feedback regarding the incident response plan, the feedback obtained from a recommendation machine learning model trained to identify gaps in the incident response plan and provide recommendations to improve the incident response plan; and refine the incident response plan, based on the response from the participant user and the generated feedback.

13. The system according to claim 12, wherein the tabletop exercise comprises a first inject and a second inject.

14. The system according to claim 13, wherein the processor is further configured to execute instructions to:

upon completion of the first inject by the participant user, lock the first inject so that the participant user can no longer access data relating to the first inject; and unlock the second inject so that the participant user can access data relating to the second inject.

15. The system according to claim 14, wherein the locking of the first inject and the unlocking of the second inject are initiated by a request from the facilitator user.

16. The system according to claim 12, wherein the processor is further configured to execute instructions to generate and distribute an after action report to the facilitator user and the participant users of the tabletop exercise regarding the tabletop exercise and the incident response plan.

17. The system according to claim 12, wherein the generated feedback regarding the incident response plan further comprises feedback from a compute metrics engine that is based on measuring the participant user's responses, the participant user's response time, and a service level agreement (SLA) response time.

18. The system according to claim 17, wherein the generated feedback from the compute metrics engine further comprises at least one of:

a determination of a mean response time of the participant user, based on how much time elapsed for the participant user to respond to the inject during the tabletop exercise;

a determination of any variation between actual response time versus service level agreement (SLA) response time;

a measurement of a participant engagement quotient, based on a number of participant users who provide responses to the inject and a total number of participant users of the tabletop exercise; and a measurement of a preparedness quotient, to determine how prepared the participant user is to respond to an incident.

19. The system according to claim 12, wherein generating feedback regarding the incident response plan further comprises:

processing a capture, by a scribe, of the participant user's response during the tabletop exercise; and based on the captured participant user's response as a training data set for the recommendation machine learning model, obtaining the recommendations from the recommendation machine learning model and validating the recommendations from the recommendation machine learning model regarding the incident response plan.

20. The system according to claim 12, wherein generating feedback comprises generating feedback from a sentiment analysis model configured to process the participant user's responses by using natural language processing (NLP) to analyze the participant user's responses made during the tabletop exercise.

21. The system according to claim 20, wherein the sentiment analysis model is further configured to determine entity recognition and relate a sentiment to the entity.

22. The system according to claim 20, wherein the sentiment analysis model is further configured to determine effort levels.

* * * * *